United States Patent
Muramatsu et al.

[11] Patent Number: 5,818,606
[45] Date of Patent: Oct. 6, 1998

[54] DIGITAL COPYING APPARATUS

[75] Inventors: Hideo Muramatsu, Shinshiro; Yoshiharu Kurozasa, Toyokawa, both of Japan

[73] Assignee: Minolta Co., Ltd., Osaka, Japan

[21] Appl. No.: 518,606

[22] Filed: Aug. 21, 1995

[30] Foreign Application Priority Data

Aug. 22, 1994 [JP] Japan ................................ 6-197003
Jul. 24, 1995 [JP] Japan ................................ 7-187140

[51] Int. Cl.⁶ .......................... H04N 1/00; H04N 1/387; H04N 1/393; H04N 1/40
[52] U.S. Cl. .......................... 358/405; 358/450; 358/403; 358/451; 358/452; 358/460; 358/434; 358/435; 358/438; 358/439; 358/407; 358/468; 399/82; 399/85; 395/114
[58] Field of Search .................... 358/405, 450, 358/403, 404, 451, 452, 460, 434, 435, 438, 439, 407, 468; 399/82, 83, 84, 85; 395/114, 115

[56] References Cited

U.S. PATENT DOCUMENTS

| | | | |
|---|---|---|---|
| 4,633,405 | 12/1986 | Ito et al. ................................ | 364/184 |
| 4,893,333 | 1/1990 | Baran et al. ............................ | 358/468 |
| 4,905,098 | 2/1990 | Sakata .................................... | 358/468 |
| 4,947,345 | 8/1990 | Paradise et al. ........................ | 364/519 |
| 5,191,440 | 3/1993 | Levine .................................... | 358/450 |
| 5,278,666 | 1/1994 | Satomi et al. .......................... | 358/405 |
| 5,280,366 | 1/1994 | Araki ...................................... | 358/460 |
| 5,283,665 | 2/1994 | Ogata ..................................... | 358/405 |
| 5,377,017 | 12/1994 | Lam ....................................... | 358/405 |
| 5,396,345 | 3/1995 | Motoyama .............................. | 358/448 |
| 5,440,408 | 8/1995 | Tomita .................................... | 358/468 |
| 5,465,160 | 11/1995 | Kamo et al. ........................... | 358/401 |
| 5,493,415 | 2/1996 | Mita et al. .............................. | 358/468 |
| 5,523,859 | 6/1996 | Nakajima et al. ...................... | 358/468 |

FOREIGN PATENT DOCUMENTS

| | | | |
|---|---|---|---|
| A20372877 | 6/1990 | European Pat. Off. ......... | H04N 1/21 |
| 62-171263 | 7/1962 | Japan .............................. | H04N 1/00 |

*Primary Examiner*—Edward L. Coles, Sr.
*Assistant Examiner*—Tia M. Harris
*Attorney, Agent, or Firm*—Burns, Doane, Swecker & Mathis, LLP

[57] ABSTRACT

In a digital copying machine having facsimile functions, in which image data can be stored for polling transmission, use of a confirmation print mode for normal copying is inhibited by modifying the appearance of copies that are produced in the confirmation print mode. This modification can be made by altering the size of the printed image, or combining additional image data with the stored image data to produce an altered version of the document.

11 Claims, 31 Drawing Sheets

Fig.22

Management Table

| Area No. | Page Inf. | Pre-link Inf. | Post-link Inf. | Registration No. | Additional Inf. |
|---|---|---|---|---|---|
| 0 1 | 1 | 0 0 | 0 2 | 0 1 | |
| 0 2 | 1 | 0 1 | F F | 0 1 | |
| 0 3 | 1 | 0 0 | 0 4 | 0 2 | |
| 0 4 | 1 | 0 3 | 0 5 | 0 2 | |
| 0 5 | 2 | 0 4 | 0 6 | 0 2 | |
| 0 6 | 2 | 0 5 | F F | 0 2 | |
| 0 7 | 1 | 0 0 | 0 8 | 0 3 | |
| 0 8 | 1 | 0 7 | F F | 0 3 | |
| ⋮ | ⋮ | ⋮ | ⋮ | ⋮ | ⋮ |

Fig.23

| | | |
|---|---|---|
| 0K | 0 1 | 1st half of image data of 1st page of Reg. No. 1 |
| 32K | 0 2 | 2nd half of image data of 1st page of Reg. No. 1 |
| 64K | 0 3 | 1st half of image data of 1st page of Reg. No. 2 |
| 96K | 0 4 | 2nd half of image data of 1st page of Reg. No. 2 |
| 128K | 0 5 | 1st half of image data of 2nd page of Reg. No. 2 |
| 160K | 0 6 | 2nd half of image data of 2nd page of Reg. No. 2 |
| 192K | 0 7 | 1st half of image data of 1st page of Reg. No. 3 |
| 224K | 0 8 | 2nd half of image data of 1st page of Reg. No. 3 |
| 256K | ⋮ | ⋮ |

Fig.24

Management Table

| Area No. | Page Inf. | Pre-link Inf. | Post-link Inf. | Registration No. | Additional Inf. |
|---|---|---|---|---|---|
| 0 1 | 1 | 0 0 | 0 2 | 0 1 | |
| 0 2 | 1 | 0 1 | F F | 0 1 | |
| 0 3 | 1 | 0 0 | 0 4 | 0 2 | |
| 0 4 | 1 | 0 3 | F F | 0 2 | |
| 0 5 | 0 | F F | F F | 0 0 | |
| 0 6 | 0 | F F | F F | 0 0 | |
| 0 7 | 1 | 0 0 | 0 8 | 0 3 | |
| 0 8 | 1 | 0 7 | F F | 0 3 | |

Fig.25

Management Table

| Area No. | Page Inf. | Pre-link Inf. | Post-link Inf. | Registration No. | Additional Inf. |
|---|---|---|---|---|---|
| 0 1 | 1 | 0 0 | 0 2 | 0 1 | |
| 0 2 | 1 | 0 1 | 0 9 | 0 1 | |
| 0 3 | 1 | 0 0 | 0 4 | 0 2 | |
| 0 4 | 1 | 0 3 | 0 5 | 0 2 | |
| 0 5 | 2 | 0 4 | 0 6 | 0 2 | |
| 0 6 | 2 | 0 5 | F F | 0 2 | |
| 0 7 | 1 | 0 0 | 0 8 | 0 3 | |
| 0 8 | 1 | 0 7 | F F | 0 3 | |
| 0 9 | 2 | 0 2 | 1 0 | 0 1 | |
| 1 0 | 2 | 0 9 | F F | 0 1 | |
| ⋮ | ⋮ | ⋮ | ⋮ | ⋮ | ⋮ |

Fig.26

Management Table

| Area No. | Page Inf. | Pre-link Inf. | Post-link Inf. | Registration No. | Additional Inf. |
|---|---|---|---|---|---|
| 0 1 | 1 | 0 0 | 0 2 | 0 1 | |
| 0 2 | 1 | 0 1 | F F | 0 1 | |
| 0 3 | 1 | 0 0 | 0 4 | 0 2 | |
| 0 4 | 1 | 0 3 | 0 5 | 0 2 | |
| 0 5 | 2 | 0 4 | 0 6 | 0 2 | |
| 0 6 | 2 | 0 5 | 0 9 | 0 2 | |
| 0 7 | 1 | 0 0 | 0 8 | 0 3 | |
| 0 8 | 1 | 0 7 | F F | 0 3 | |
| 0 9 | 3 | 0 6 | 1 0 | 0 2 | |
| 1 0 | 3 | 0 9 | F F | 0 2 | |
| ⋮ | ⋮ | ⋮ | ⋮ | ⋮ | ⋮ |

DIGITAL COPYING APPARATUS

FIELD OF THE INVENTION

The present invention relates to a digital copying apparatus having facsimile functions.

DESCRIPTION OF THE RELATED ART

In recent years, digital copying machines which read a document image by means of an image sensor, generate image data, and print such image data by means of a printing device have become widespread. Since these digital copying machines are equipped with a printing device, some of them have been endowed with features that permit them to be connected to a telephone line to provide facsimile functions. A copy machine is desired which is placed in a copy-ready status prior to use by means such as input of an ID code, attachment of a key counter, or insertion of a magnetic card. In these types of machines, the number of copies is regulated for each ID card.

Various functions have become widespread in facsimile devices, such as memory transmission, in which image data stored in a memory is automatically transmitted at a reserved time, or polling transmission, in which image data is transmitted in response to a call from a calling party. In facsimile devices equipped with such functions, a confirmation printing function is desired so that image data stored in memory can be confirmed by reading and printing such data on supplied paper.

Consequently, digital copying machines equipped with facsimile functions must be provided with both the copy number management for individual ID cards that is needed in a copy function and the confirmation printing that is needed in a facsimile function. In digital copying machines provided with both features, the application of management by ID code to the facsimile function reduces the convenience of facsimile use. Thus, management by ID code must be avoided during the facsimile function. However, the fact that confirmation printing in a facsimile function and a copy image are produced in the same way allows copying to be carried out using confirmation printing and makes management by ID code impossible.

The present invention was created in light of the aforesaid realities and prevents copying by means of confirmation printing in a digital copying apparatus equipped with facsimile functions.

SUMMARY OF THE INVENTION

In a digital copying machine having facsimile functions, in which image data can be stored for delayed or polling transmission, use of a confirmation print mode for normal copying is inhibited by modifying the appearance of copies that are produced in the confirmation print mode. This modification can be made by altering the size of the printed image, or combining additional image data with the stored image data to produce an altered version of the document.

BRIEF DESCRIPTION OF THE DRAWINGS

FIG. 22 shows the management table for managing image data registered for polling transmission;

FIG. 23 shows the code memory storing image data registered for polling transmission;

FIG. 24 shows a first example of the management table shown in FIG. 22 as updated by overwriting;

FIG. 25 shows another example of the management table shown in FIG. 22 as updated by overwriting;

FIG. 26 shows the management table shown in FIG. 22 as updated by appending;

DESCRIPTION OF THE PREFERRED EMBODIMENTS

Preferred embodiments of a digital copying apparatus which possesses facsimile functions in accordance with the present invention are described hereinafter with reference to the accompanying drawings.

(1) Complete Structure of Digital Copying Apparatus

Figure 1:
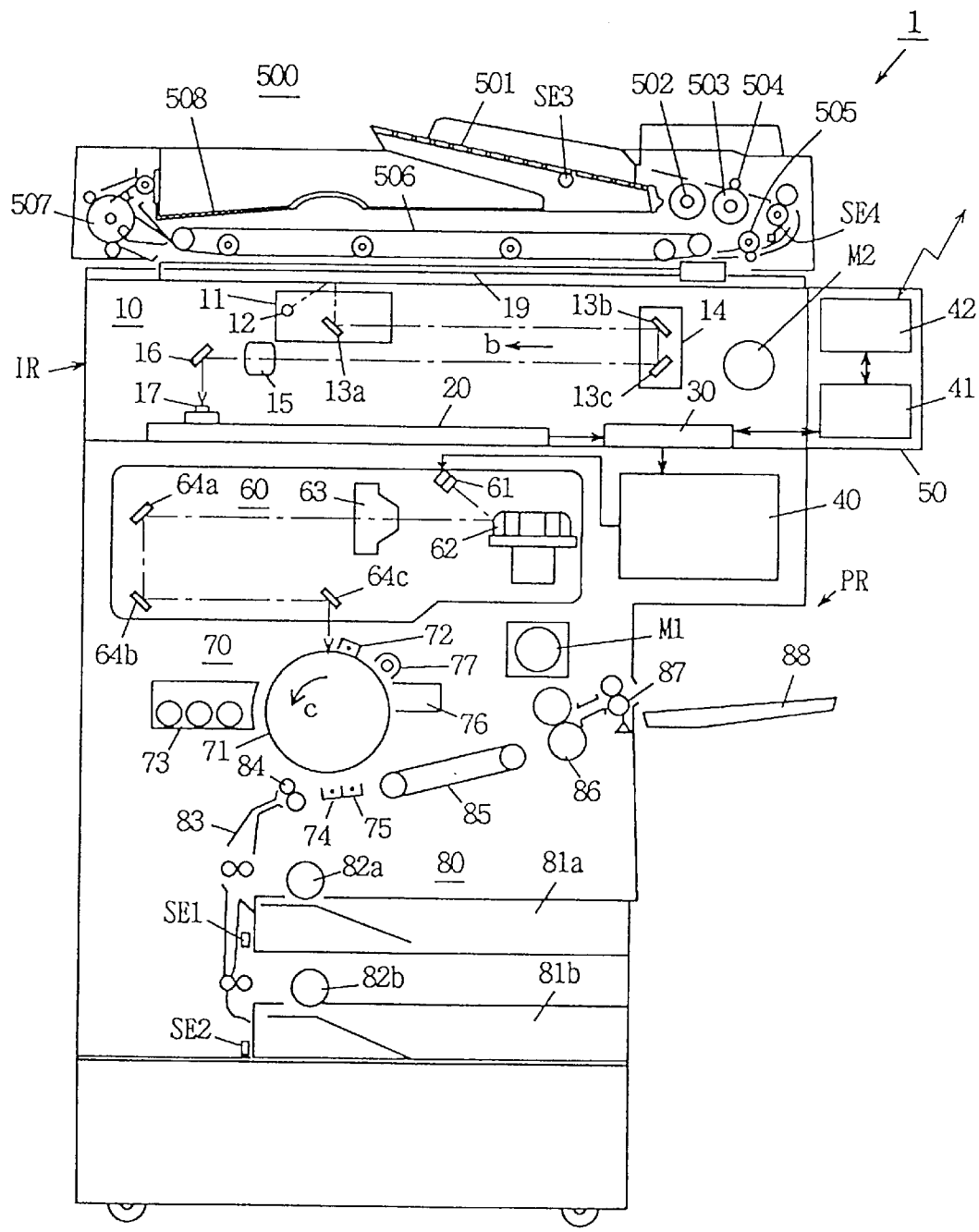
FIG. 1 is a section view showing the general structure of a digital copying apparatus incorporating the present invention.

FIG. 1 is a cross-sectional view showing the simplified structure of a digital copying apparatus 1 that possesses facsimile functions. Documents to be copied, documents for facsimile transmission, or documents to be registered for polling transmission are placed image-side down on document platen 19, the placed documents are read, and an output image is produced on supplied paper when copying is carried out. Digital copying apparatus 1 comprises an automatic document feeder 500 (referred to as "ADF 500" hereinafter), which feeds one document page at a time to a document platen 19 and places it on the document platen 19; an image reading device IR, which reads a placed document image and produces image data; a printer device PR, which receives image data from the image reading device IR and forms an image on supplied paper; and a facsimile transmission unit 50, which is connected to a telephone line (PSTN) and performs facsimile transmission.

ADF 500 is provided at the upper region of the copy machine unit, can be opened and closed, and comprises a document placement tray 501, a pickup roller 502, a guide roller 503, a separation pad 504, a register roller 505, a conveyer belt 506, a reverse roller 507, and a paper ejection tray 508. In the document placement tray 501, multiple documents are placed one atop another with the image-reading side up. Pickup roller 502 supplies the placed documents one page at a time from the bottom-most layer, and the documents are guided by guide roller 503 and separation pad 504, follow a conveyer path, and are turned over (reversed). The reversed documents are conveyed by way of register roller 505 to document platen 19 and positioned thereon, and image reading device IR reads the images of the documents. After reading is complete, the documents are conveyed by conveyer belt 506 past reverse roller 507 and are ejected onto paper ejection tray 508.

Where double-sided documents are concerned, the image of one side is read, and the document travels around reverse roller 507 one time and is returned to document platen 19. For this purpose, conveyer belt 506 is capable of forward and reverse rotation. Sensor SE3 is also provided for detection of whether a document has been placed in document placement tray 501. Sensor SE4 is provided along the transit path from document placement tray 501 to document platen 19 and detects document size and orientation during the interval in which a document in transit is detected.

When a document is read without using ADF 500, an operator opens ADF 500, manually places a document on document platen 19, closes ADF 500, and executes a reading operation. Even in such cases, the size and orientation of a document placed on document platen 19 is detected. Specifically, the outside of ADF 500 conveyer belt 506 (the side confronting document platen 19) is colored orange, and the spectral sensitivity of line sensor 17 comprises short wavelengths with regard to light originating from projector lamp 12 and reflected by the outside of conveyer belt 506. Consequently, when a document is placed on document platen 19, ADF 500 is closed and reading is carried out, line sensor 17 reads the document and its background formed by the outside of conveyer belt 506, and image data from the document area is obtained through the reading operation. Document size and orientation is determined from image data pertaining to the sampled document area.

Image reading device IR comprises a scanning optical system 10, which scans a document image to produce image data; an image data processing unit 20, which processes image data sent from scanning optical system 10; and a memory unit 30, which switches between storing image data sent from image data processing unit 20, or outputting such data to printer device PR in the form of unmodified print data.

Scanning optical system 10 is provided below document platen 19 and comprises an exposure lamp 12, a first mirror 13a, a first scanner 11 holding the mirror 13a, a second mirror 13b, a third mirror 13c, a second scanner 14 holding mirrors 13b and 13c, an imaging lens 15, a mirror 16, a line sensor 17 having multiple imaging elements arranged in lines, and a scanner motor M2. First scanner 11 and second scanner 14 are driven by scanner motor M2 and move directly beneath document platen 19 in the direction of arrow b (subscan direction), perpendicular to the arrangement of scanning elements (main scan direction) of line sensor 17.

Facsimile transmitter/receiver unit 50 includes a facsimile converter 41 connected to the memory unit 30 and a Group-3 (G3) transmit/receive unit 42 connected to a telephone line (PSTN).

Image data processing unit 20 and memory unit 30 are described in detail hereinafter.

Printer device PR includes a print processing unit 40, which drives optical system 60 based on image data sent from memory unit 30; an optical system 60, which scans a photosensitive drum 71 with a laser beam originating from a semiconductor laser 61; an imaging system 70, which performs developing, transfer, and other imaging processes for latent images formed on a photosensitive drum 71; and a paper supply conveyer system 80.

Print processing unit 40 accepts image data received by image reading device IR or by facsimile and controls the operation of semiconductor laser 61 based on the image data.

Optical system 60 includes the semiconductor laser 61 which is modulated (on, off) by print processing unit 40; a polygonal mirror 62, which deflects and scans a laser beam originating from semiconductor laser 61, an f lens 63, which corrects distortional aberrations of the deflected laser beam; and mirrors 64a, 64b, and 64c, which direct the laser beam onto the photosensitive drum 71.

Imaging system 70 includes the photosensitive drum 71, rotationally driven in the direction of the arrow c; and a charger 72, developing units 73, a transfer charger 74, a paper separating charger 75, a cleaner 76, and an eraser lamp 77 all arranged along the rotational direction of photosensitive drum 71.

A laser beam originating from optical system 60 and modulated according to image data performs a linear scan of the surface of photosensitive drum 71 which is uniformly charged by charger 72, and an electrostatic latent image corresponding to the image data is formed on the surface of photosensitive drum 71. An electrostatic latent image thus formed is developed by developing units 73 and transferred by transfer charger 74 onto paper conveyed by paper supply conveyer system 80, described hereinafter. After transfer, the surface of photosensitive drum 71 is cleaned by cleaner 76, and residual charge is erased by eraser lamp 77. Then, once again, the surface is charged by charger 72, and an image is formed.

Paper supply conveyer system 80 includes paper supply cassettes 81a and 81b; paper supply rollers 82a and 82b; paper supply transit path 83, timing roller 84, conveyer belt 85, fixing unit 86, ejection roller 87, and paper ejection tray 88. Paper supply cassettes 81a and 81b can accommodate either B5 or A4 size paper in either a vertical or a horizontal orientation and B4 and A3 size paper in a vertical orientation, and paper of any size in any orientation is accommodated in stacked form. The size and orientation of the accommodated paper is detected by sensors SE1 and SE2.

Paper within paper supply cassettes 81a and 81b is supplied one sheet at a time by paper supply rollers 82a and 82b and conveyed along paper supply transit path 83 to timing roller 84. Timing roller 84 sends supplied paper to the transfer area in synchronization with an image formed on photosensitive drum 71. A paper bearing a transferred image is sent by conveyer belt 85 into fixing unit 86, the image is fixed by fixing unit 86, and the paper is then ejected by ejection roller 87 onto paper ejection tray 88. Paper supply conveyer system 80 and photosensitive drum 71 are driven by main motor M1.

Figure 2:
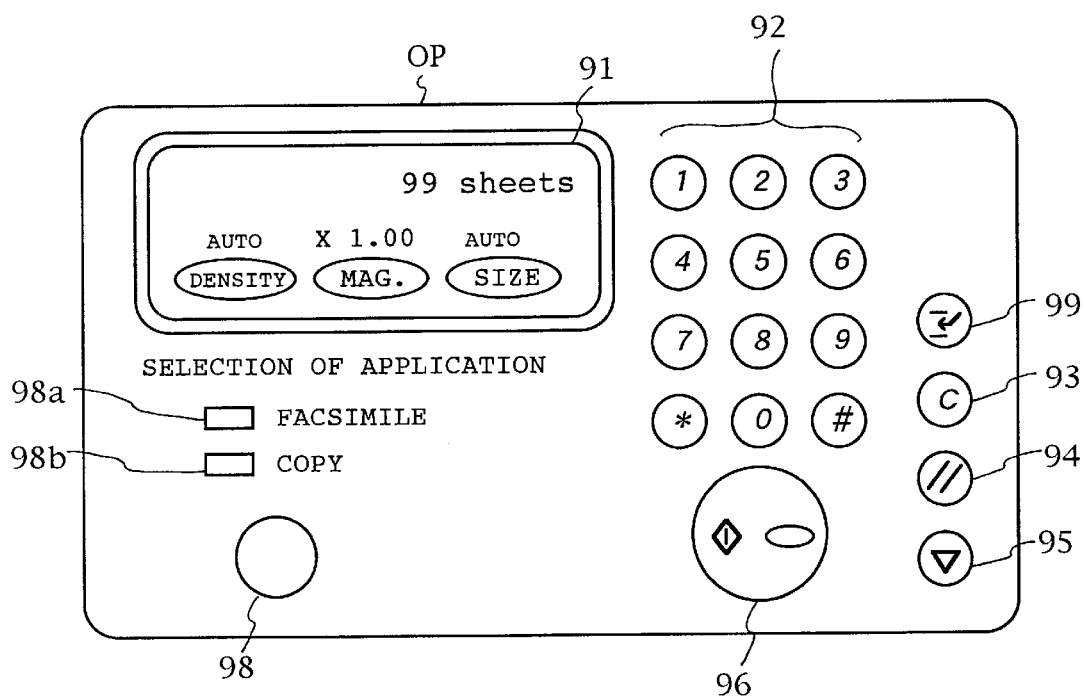
FIG. 2 is a plan view of an operating panel.

FIG. 2 is a plan view of an operating panel OP provided at the top portion of digital copying apparatus 1. On the operating panel OP are provided a liquid crystal touch panel 91; a ten-key pad 92 for inputting data designating a number of copies, a copy magnification factor, and facsimile numbers of other parties, etc.; a clear key 93, which returns a value input by ten-key pad 92 to a standard value of [1]; a panel reset key 94, which returns various settings indicating copy mode conditions set within the copy machine to their standard values; a stop key 95, which cancels a copy operation or facsimile operation; a start key 96, which begins a copy operation or facsimile operation; and an interrupt key 99, which interrupts copying or report output in progress so that copy or facsimile transmission can be carried out.

Also provided on operating panel OP are a mode switch key 98, which switches between facsimile mode and copy mode; an indicator 98a, which indicates that facsimile mode has been selected; and an indicator 98b, which indicates that copy mode has been selected. Copy mode allows a copying operation, and facsimile mode allows various operations related to facsimile functions, discussed hereafter; for example, facsimile transmission, registration of polling transmissions, and confirmation printing. Conversely, the above-noted various operations related to facsimile function are not possible in copy mode, and a copy operation is not possible in facsimile mode.

Liquid crystal touch panel 91 allows display of multiple screens, and FIG. 2 shows a status in which a copy operation screen is displayed. This copy operation screen displays the operating status of the copy machine during a copy operation, including exposure level (density), copy magnification factor, paper size, and number of copies. A screen for use in facsimile transmission displays the facsimile number of another party, transmission resolution, operating conditions in polling or other facsimile transmission, facsimile operating status during transmission and receiving, and other information. In addition, operating conditions can be input by means of the respective display screens, using liquid crystal touch panel 91; for example, copy operation conditions such as density, copy magnification ratio, and paper size, and facsimile operation conditions such as transmission resolution.

(2) Structure of Control Unit

Figure 3:
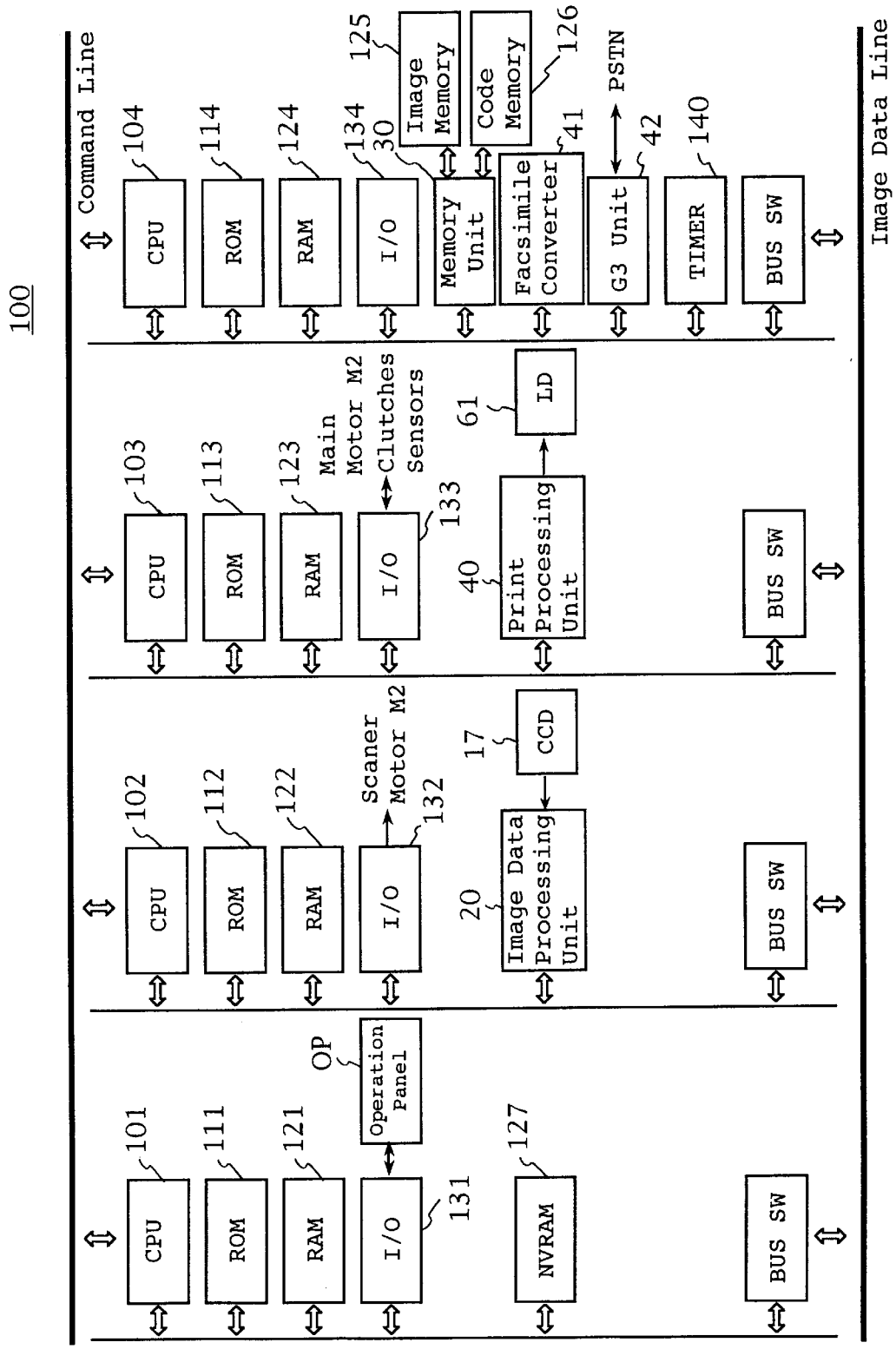
FIG. 3 is a block diagram of a control unit.

FIG. 3 is a block diagram showing the structure of control unit 100 of digital copying apparatus 1. Microcomputers 101 through 104 (referred to as "CPUs 101 through 104" hereinafter) are central to the structure of control unit 100. CPUs 101 through 104 are respectively connected to ROM 111 through ROM 114, which house programs executed by the respective CPUS, and to RAM 121 through RAM 124, which form working areas.

CPUs 101 through 104 are also connected to each other on a command line and are structured to allow the exchange of necessary information. Input and output image data is carried out through an image data line, and at such time, each component is connected to the image data line by respective data bus switches BUS SW.

Individual control units will now be described. CPU 101 exercises control of input from various operation keys on operating panel OP and display output to liquid crystal touch panel 91, via I/O interface 131. Initial mode settings and code numbers, etc. of operating panel OP are stored in non-volatile RAM (NVRAM) 127.

Via I/O interface 132, CPU 102 exercises drive control of scanning optical system 10 and exercises control of each component of image reading device IR, and particularly image data processing unit 20.

Via I/O interface 133, CPU 103 exercises control of optical system 60; imaging system 70; and each component of printer device PR, and particularly print processing unit 40.

Via I/O interface 134, CPU 104 carries out processing for setting operating modes and for adjusting timing for the operation of all components in control unit 100. In addition, control of memory unit 30 temporarily stores image data that has been read in image memory 125 and code memory 126. This data is read out and output to print processing unit 40 while in the copy mode, output to facsimile converter 41 during facsimile transmission, and then output to a telephone line (PSTN) via G3 unit 42. During facsimile reception, image data received on a telephone line is temporarily stored via facsimile converter 41 and G3 unit 42 in image memory 125 and code memory 126, and this data is read out and output to print processing unit 40.

In the facsimile mode, control of facsimile converter 41 accomplishes data conversion such as pixel density conversion processing between memory unit 30 and G3 unit 42.

Image data processing unit 20 will now be described. Image data processing unit 20 processes image signals output from line sensor 17 and outputs image data to memory unit 30. Image data processing unit 20 comprises an A/D converter, a shading correction unit, a zoom processing unit, and an image quality correction unit. Image signals input from line sensor 17 undergo A/D conversion and are quantized as eight bit image data per pixel. After various processing such as shading correction, zoom processing, and image quality correction is carried out, image data is output.

Memory unit 30 comprises a switching unit; binarizer which creates binary data based on parameter settings from CPU 104; multiport image memory 125 having a capacity of two A4 pages at 400 dpi; a signal processing unit possessing an independently operable compressor and expander, respectively; multiport-equipped code memory 126; a rotation processing unit; and a multi-level converter which creates analog data based on parameter settings from CPU 104. CPU 104 controls all these components.

Facsimile converter 41 is positioned between memory unit 30 and G3 unit 42 and has the purpose of converting image data formats during facsimile transmission and receiving. This conversion includes the following types of conversion: pixel density conversion of image data, enlargement/reduction of image data, bit-width conversion of signal data, and signal format conversion of signal data. This processing is performed by CPU 104.

(3) Operating Sequence of Complete Copy Machine

The operating sequence of the complete copy machine in various operations is described with reference to FIGS. 4 through 8. The description centers on commands or data flows such as requests and responses sent and received among CPUs 101 through 104. Certain requests, responses, and other commands that are not necessary to an understanding of the operation described herein are omitted. In facsimile transmission, the facsimile apparatus which initiates the call is termed the "calling party," and the facsimile apparatus to which the call is directed is termed the "called party." Likewise, in facsimile transmission, the facsimile apparatus transmitting image data is termed the "transmitting party," and the facsimile apparatus receiving image data is termed the "receiving party." Thus, in normal facsimile transmission, the calling party facsimile apparatus is the transmitting party and transmits image data, and the called party facsimile apparatus is the receiving party and receives image data. However, in polling transmission, the calling party facsimile apparatus is the receiving party and receives image data, and the called party facsimile apparatus is the transmitting party and transmits image data.

(3-1) Operating Sequence During Facsimile Transmission

Figure 4:
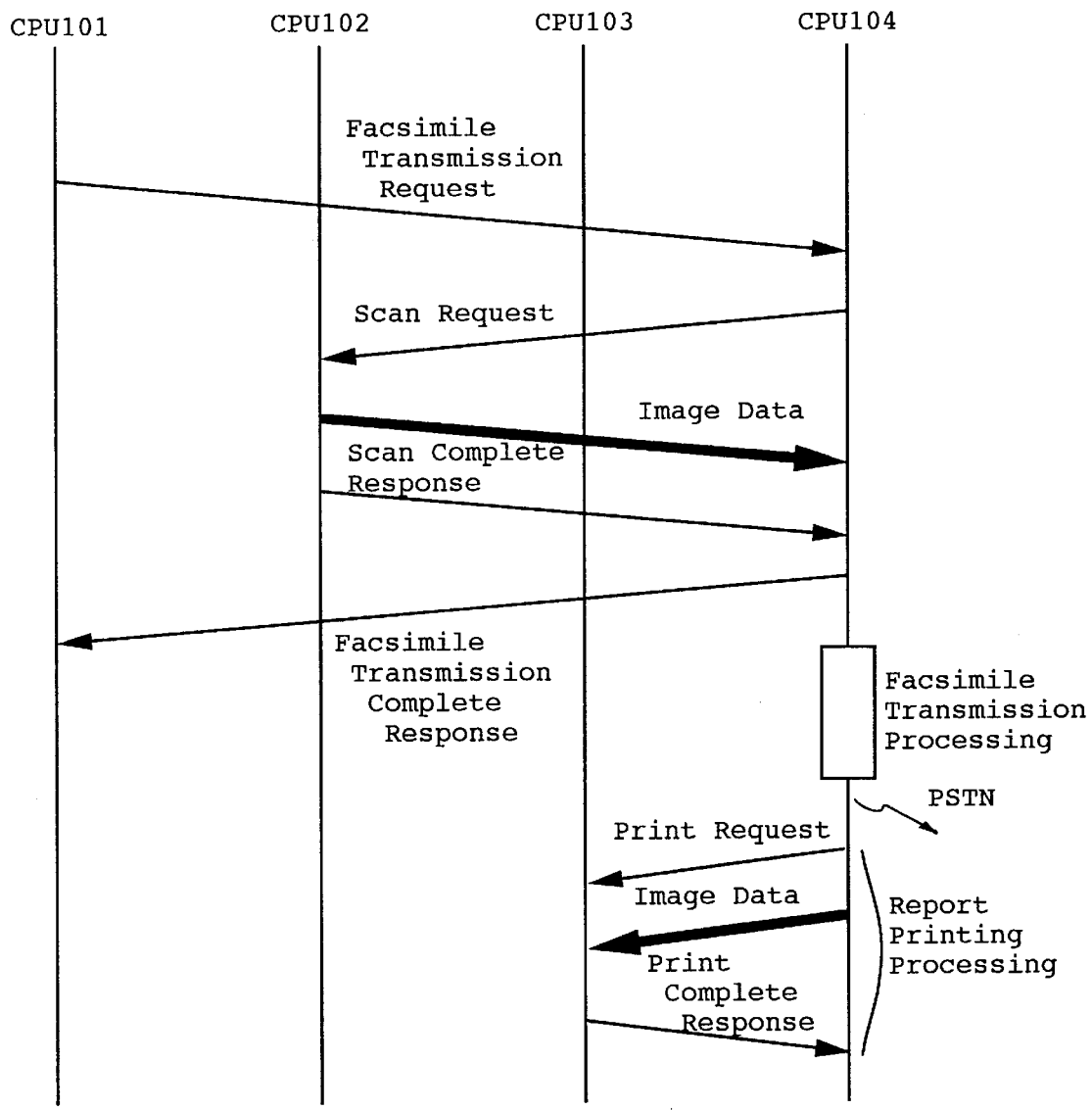
FIG. 4 is a signal flow diagram showing the command and image data exchange between each CPU in a facsimile transmission operation.

FIG. 4 is a figure showing the operating sequence in facsimile transmission. In facsimile transmission, image data read by image reading device IR is temporarily written to image memory 125, undergoes compression processing and is stored in code memory 126, then undergoes data conversion by facsimile converter 41 and facsimile transmission.

Specifically, when start key 96 is pressed in the facsimile mode, CPU 101 issues a facsimile transmission request to CPU 104. Upon receipt of the request, CPU 104 issues a scan request to CPU 102. Accordingly, CPU 102 begins a scan and performs image processing when the image area of a document is reached. Processed image data is output to memory unit 30 and stored in image memory 125. Thereafter, CPU 104 carries out compression (encoding) of the image data in image memory 125, and the compressed image data (code data) is stored in code memory 126.

When document image reading via scanning is complete, CPU 102 issues a scan complete response to CPU 104, and CPU 104 issues a facsimile transmission complete response to CPU 101. When all compressed image data to be transmitted is stored in code memory 126, CPU 104 initiates a line connection by controlling G3 unit 42, a call is thus made to a called receiving party, line connection is carried out, and a line connection acknowledgment is received.

Next, CPU 104 reads out the compressed image data and provides output to facsimile converter 41, where image data conversion is performed. The data is then modulated by a modem in G3 unit 42 and transmitted to a called receiving party via a telephone line (PSTN). When transmission of image data is complete, CPU 104 sends a line disconnect request to the called receiving party, performs line disconnect processing, clears image memory 125, and concludes the operation.

When a transmission report is printed after facsimile transmission is complete, or when a transmission error report is printed due to an error, etc. during transmission, CPU 104 issues a print request to CPU 103. Accordingly, CPU 104 creates the image data for printing the report in image memory 125, the image data is output to print processing unit 40, and print processing unit 40 begins printing. When report printing is complete, CPU 103 issues a print complete response to CPU 104, clears the memory, and concludes the operation.

Here, "transmission report" refers to a transmission record automatically printed after completion of a given number of facsimile transmissions or at a given interval (e.g., 12:00 daily), wherein a report is printed which lists details of each facsimile transmission such as number of document pages transmitted, date and time of transmission, and destination. A transmission error report is a report printed to inform an operator that a transmission error or other abnormality occurred during facsimile transmission and normal facsimile transmission was not accomplished. The error report notes the destination, date and time of transmission, and the characters "N.G." indicating that an error occurred.

(3-2) Operating Sequence During Facsimile Reception

Figure 5:
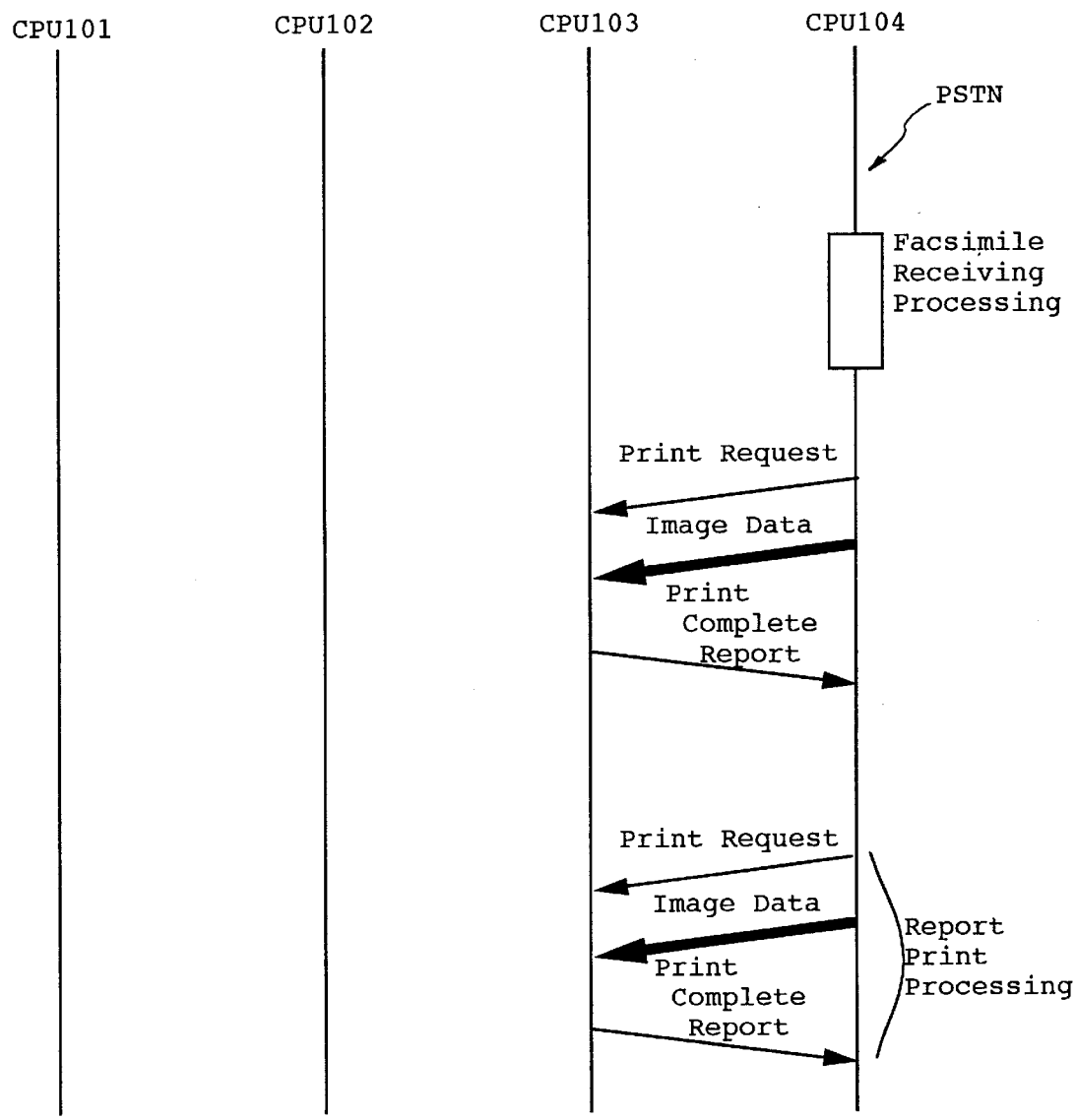
FIG. 5 is a signal flow diagram showing the command and image data exchange between each CPU in a facsimile receiving operation.

FIG. 5 is a figure showing the operating sequence that occurs during reception of a facsimile. In facsimile reception, received image data undergoes data conversion by facsimile converter 41, and is stored in code memory 126, subjected to decompression processing, written to image memory 125, output to printer device PR, and printed.

Specifically, when a calling transmitting party makes an incoming call request to CPU 104 in the facsimile mode, CPU 104 completes a line connection. Next, CPU 104 sets various parameters for facsimile reception which indicate information such as encoding scheme, receiving magnification factor, number of pixels per received image line, number of pixels per input image line, and maximum allowable line errors per line.

When preparation of code memory 126 to receive data is complete, image data sent from the calling transmitting party is demodulated by a modem in G3 unit 42, subjected to data conversion by facsimile converter 41, and stored in code memory 126. When receipt of image data is complete, CPU 104 performs line disconnect processing and issues a print request to CPU 103. When issuing a print request, CPU 104 next decompresses the image data, the image data is written to image memory 125, image data read from the memory is output to printer device PR, and printing is carried out.

When printing is complete, CPU 103 issues a print complete response to CPU 104. Upon receipt of this response, CPU 104 clears image memory 125 and concludes the operation. When a reception report is generated after facsimile reception is complete, or when a reception error report is generated due to an error during reception, CPU 104 issues a print request to CPU 103. Accordingly, CPU 104 creates the image data for printing the report in image memory 125, the image data is output to print processing unit 40, and print processing unit 40 begins printing. When report printing is complete, CPU 103 issues a print complete response to CPU 104, clears image memory 125, and concludes the operation.

In this context, "reception report" refers to a reception record that is automatically printed after a given number of facsimiles are received or at a given interval (e.g., 12:00 daily), wherein a report is printed which lists details of each facsimile received such as number of document pages received, and date and time of receipt. A reception error report is a report printed to inform an operator that a reception error or other abnormality occurred during facsimile reception and normal facsimile reception was not accomplished. The reception error report notes the date and time of receipt, and the characters "N.G." indicating that an error occurred.

The preceding discussion of the operating sequence during facsimile reception describes operations that take place in the facsimile mode. When facsimile reception takes place in the copy mode, operations are similar to those in the facsimile mode in that received image data is stored in code memory 126, but a printing operation does not take place immediately. The printing operation is postponed until the facsimile mode is established, after which, a print request is issued to CPU 103, and printing is executed.

(3-3) Operating Sequence During Polling Transmission

Figure 6:
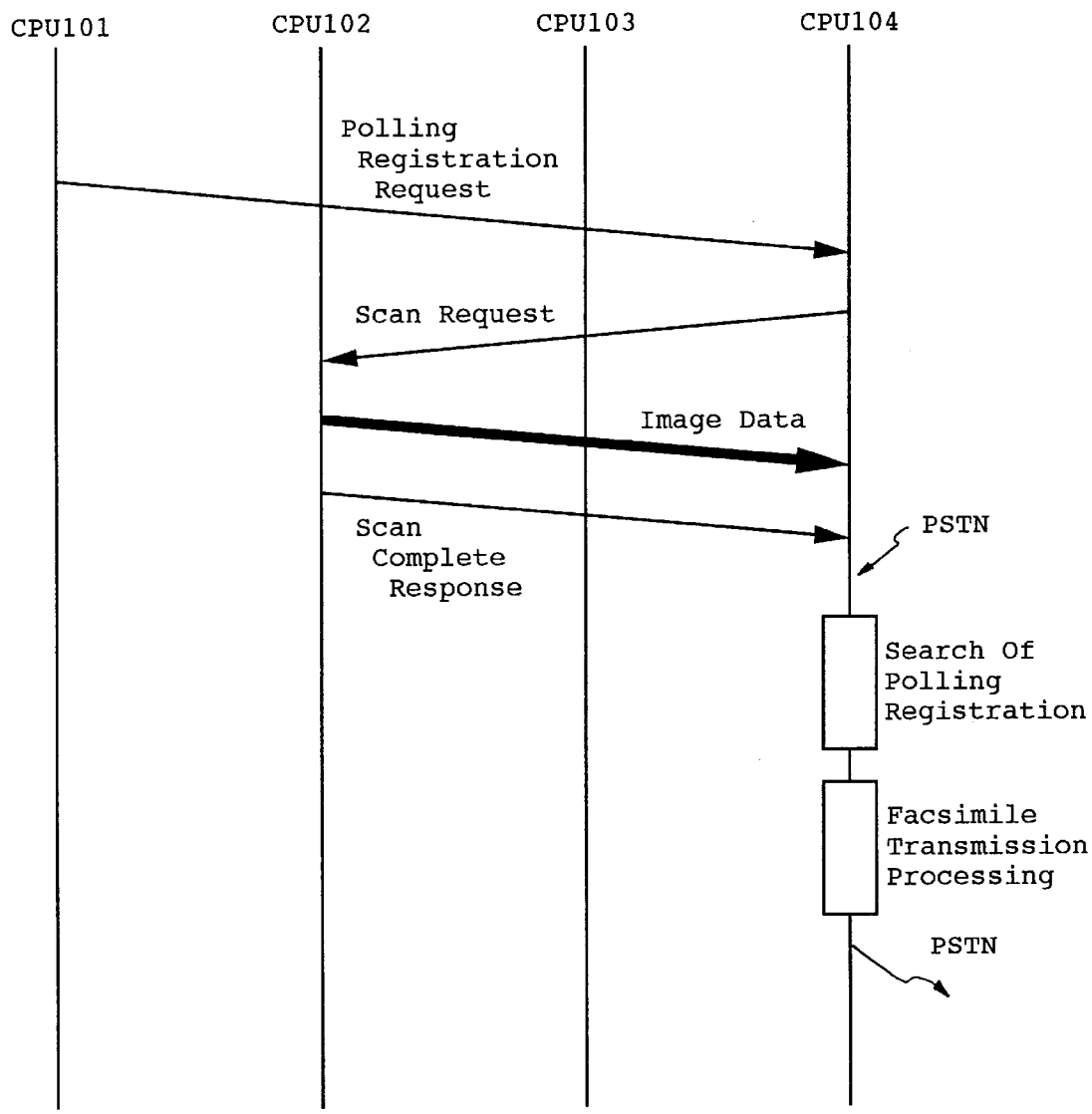
FIG. 6 is a signal flow diagram showing the command and image data exchange between each CPU in a polling transmission operation.

FIG. 6 is a figure showing the operating sequence during polling transmission. In polling transmission, document image data read by image reading device IR is temporarily written into image memory 125, subjected to compression processing and stored in code memory 126, and a polling transmission is thus registered. Multiple polling transmissions can be registered; thus, a management table created in RAM 124 provides management. When a set of image data among multiple registered sets of image data is designated for transmission, the designated image data is read from code memory 126 and subjected to data conversion by facsimile converter 41 and then transmitted.

Specifically, when operations for registering a polling transmission are carried out by operation of operating panel OP, CPU 101 issues a polling registration request to CPU 104. Upon receipt of the request, CPU 104 issues a scan request to CPU 102. Accordingly, CPU 102 begins a scan and performs image processing when the image area of a document is reached. Processed image data is output to memory unit 30 and stored in image memory 125. Thereafter, CPU 104 carries out compression of the image data in image memory 125, and the compressed image data is stored in code memory 126. Meanwhile, the management table created in RAM 124 is updated.

The foregoing description constitutes registration of a polling transmission, and when registration of a polling transmission is accomplished, an incoming call request from a calling receiving party is awaited. When a calling receiving party makes an incoming call request to CPU 104, CPU 104 completes a line connection. Next, CPU 104 receives a polling designation number transmitted by the calling receiving party, the management table in RAM 124 is searched for the polling designation number received, and designated image data is read from code memory 126 on this basis. CPU 104 then provides the image data to facsimile converter 41, where image data conversion is performed. The data is then modulated by a modem in G3 unit 42 and transmitted to a calling receiving party via a telephone line (PSTN). When transmission of the image data is complete, CPU 104 sends a line disconnect request to the calling receiving party, performs line disconnect processing, clears image memory 125, and concludes the operation.

(3-4) Operating Sequence During Copy Operation

Figure 7:
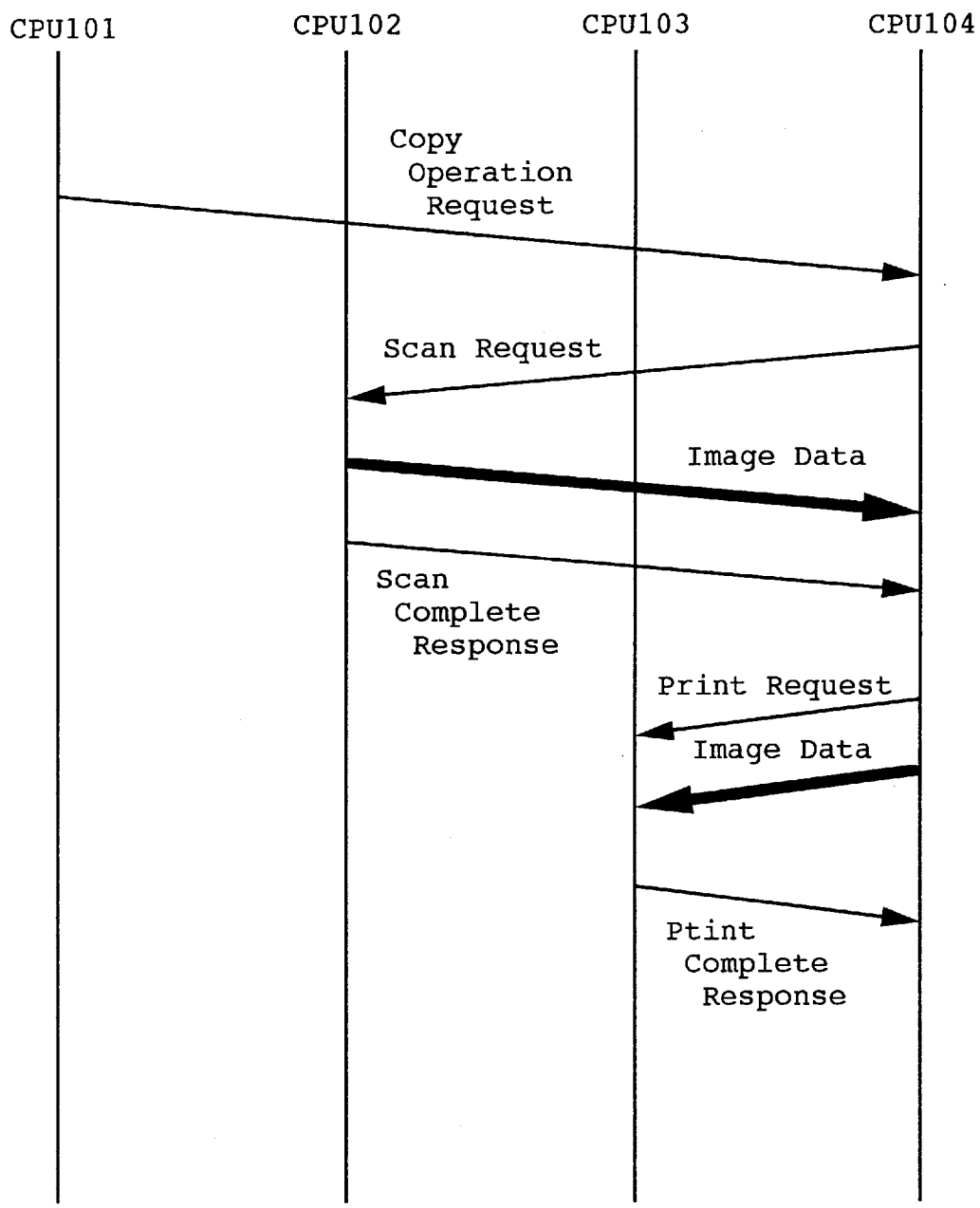
FIG. 7 is a signal flow diagram showing the command and image data exchange between each CPU in a copy operation.

FIG. 7 is a drawing showing the operating sequence in a copy operation. In a copy operation, image data read by image reading device IR is temporarily written into image memory 125, output from image memory 125 to print processing unit 40, and printed.

Specifically, when start key 96 is pressed in the copy mode, CPU 101 issues a copy operation request to CPU 104. Upon receipt of the request, CPU 104 issues a scan request to CPU 102. Accordingly, CPU 102 begins a scan and performs image processing when the image area of a document is reached. Processed image data is output to memory unit 30 and stored in image memory 125.

When document image reading via scanning is complete, CPU 102 issues a scan complete response to CPU 104, and CPU 104 issues a print request to CPU 103. Accordingly, CPU 104 reads the image data for copying from image memory 125, the image data is output to print processing unit 40, and print processing unit 40 begins printing. When printing is complete, CPU 103 issues a print complete response to CPU 104, clears image memory 125, and concludes the operation.

(3-5) Operating Sequence During Confirmation Printing

Figure 8:
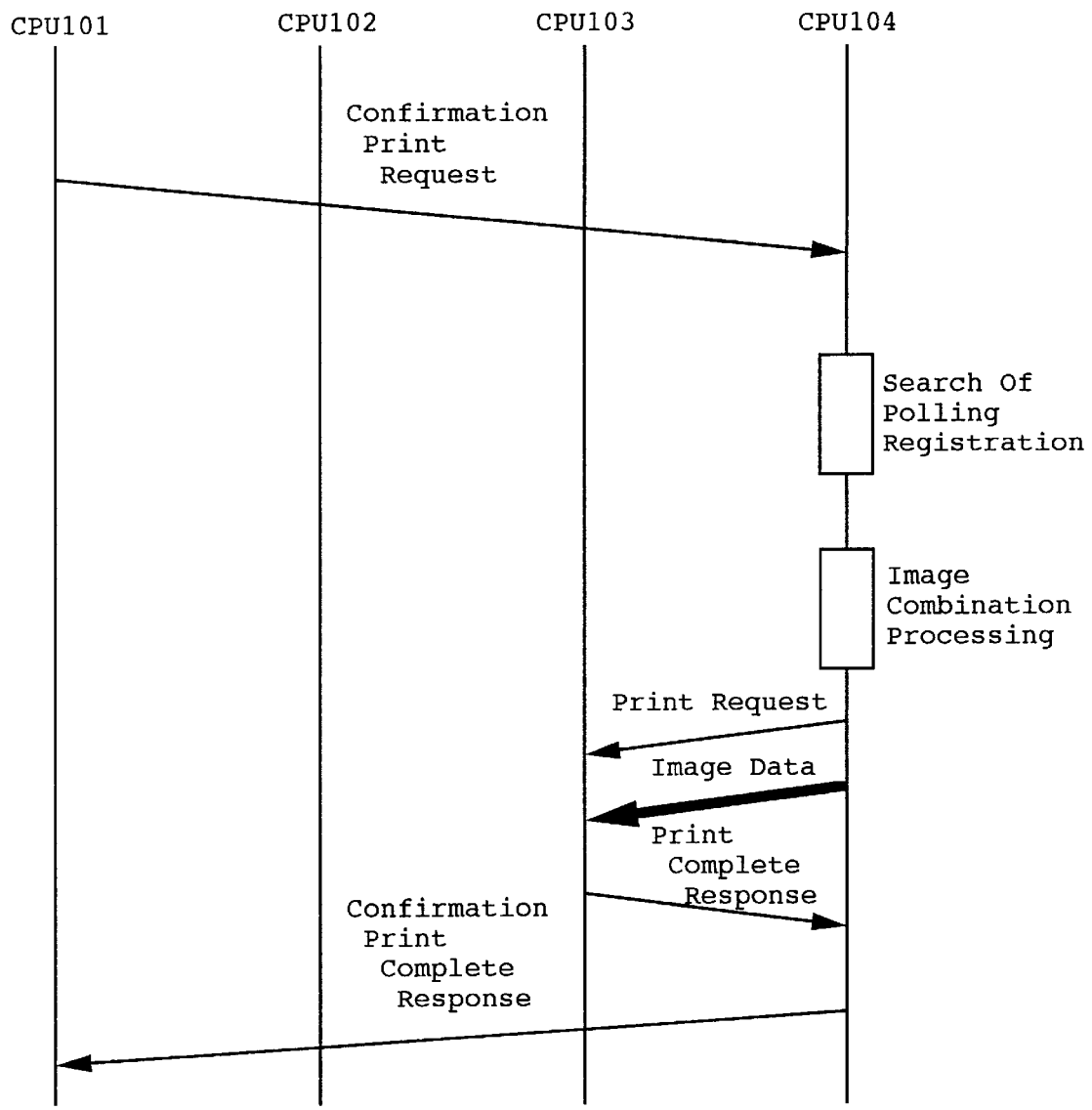
FIG. 8 is a signal flow diagram showing the command and image data exchange between each CPU in a confirmation printing operation.

FIG. 8 is a figure showing the operating sequence in confirmation printing. Here, "confirmation printing" refers to image data that is registered for polling transmission being read from code memory 126 and printed on paper in order to allow a check of the type of documents registered for polling transmission.

Specifically, when start key 96 is pressed in the confirmation printing mode, CPU 101 issues a confirmation print request to CPU 104. Upon receipt of the request, CPU 104 searches the management table in RAM 124 for a polling transmission registration number indicated by operating panel OP, and on this basis, image data corresponding to the designated registration number is read from code memory 126 and decompressed, a predetermined pattern is read from ROM 114, and the decompressed image data and the predetermined pattern are combined in image memory 125. Next, the combined image data is output to print processing unit 40, and print processing unit 40 begins printing. When printing is complete, CPU 103 issues a print complete response to CPU 104. Upon receiving the response CPU 104 outputs a confirmation printing complete response to CPU 101, clears image memory 125, and concludes the operation.

In this confirmation printing, the combination of image data with a predetermined pattern is for the purpose of distinguishing images produced by copy operations and images produced in confirmation printing.

(4) Individual CPU Descriptions

The control procedures carried out by CPUs 101 through 104 are described hereinafter with reference to the accompanying flow charts. In the following description, numbers designated with the number sign # refer to the steps shown in the flow charts.

(4-1) CPU 101 Control Procedures

Figure 9:
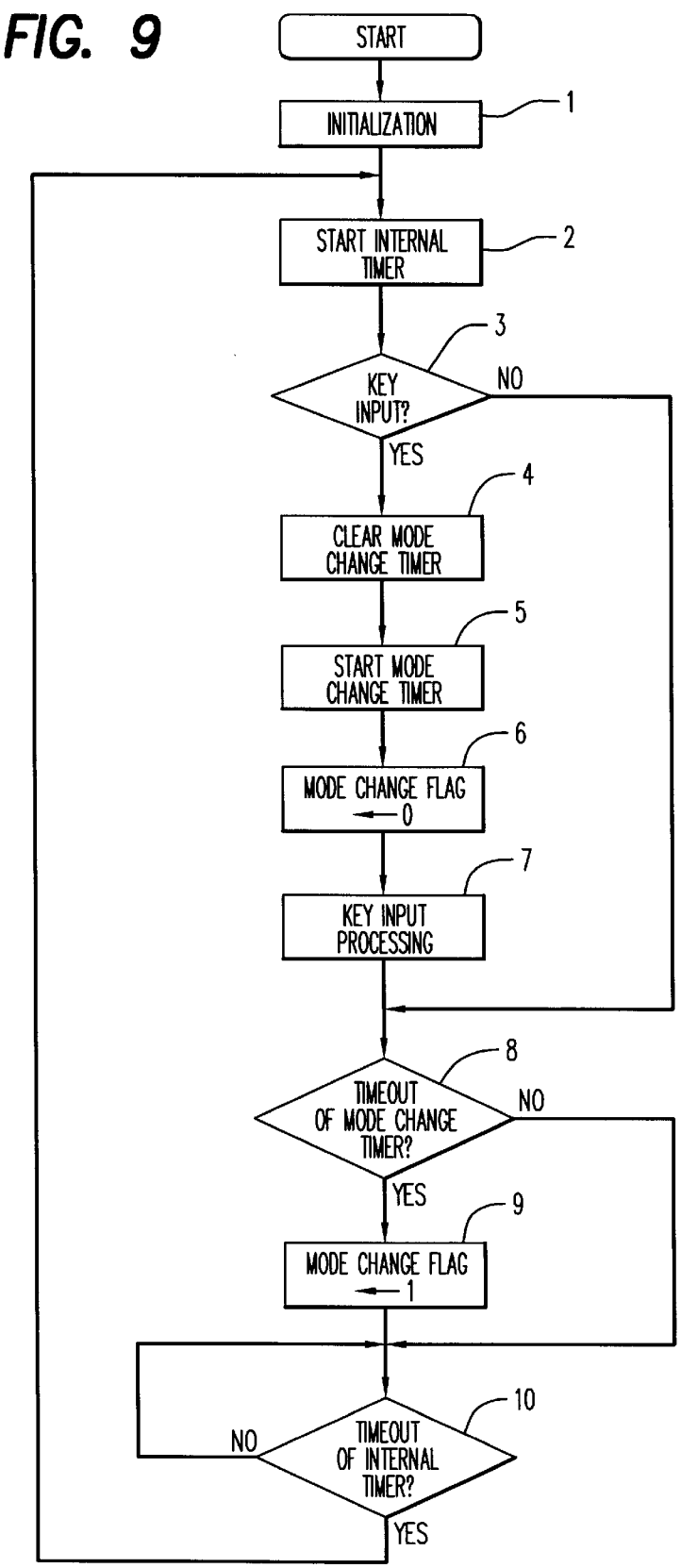
FIG. 9 is a main flow chart showing control procedures executed by the CPU 101.

FIG. 9 is a main flow chart showing the control procedures executed by CPU 101. Referring to FIG. 9, once the digital copying apparatus is powered on, in the initial setup routine, (#1), a panel display program stored in ROM 111 and a basic facsimile screen stored in NVRAM 127 and serving as the initial screen are read, and the basic facsimile screen is displayed on liquid crystal touch panel 91 of operating panel OP. Next, internal timer measurement regulating the processing time of a single routine begins (#2), and the routine awaits keyed input from operating panel OP. When keyed input is produced (YES at #3), the value of a mode change timer is set to [0] (#4), timing by the mode change timer begins (#5), and a mode change flag is set to [0] (#6). The mode change timer is a timer which begins timing when keyed input from operating panel OP exists, or, when a copy operation ends. In response to timeout of this timer, the mode of the digital copying apparatus shifts to facsimile mode. If the interval until timeout of the mode change timer is, for example, 10 minutes, the digital copying apparatus will shift to facsimile mode when 10 minutes have passed since the last key input or the end of the last copy operation. The mode change flag is a flag set to [1] upon timeout of the mode change timer, and the facsimile mode is established by determining the status of the mode change flag. Next, key input processing is executed in #7 according to the type of keyed input discerned in #3. Timeout of the mode change timer is detected in #8, the mode change flag is set to [1] in #9, stoppage of the internal timer is awaited in #10, and processing in #2 is executed again.

Figure 10:
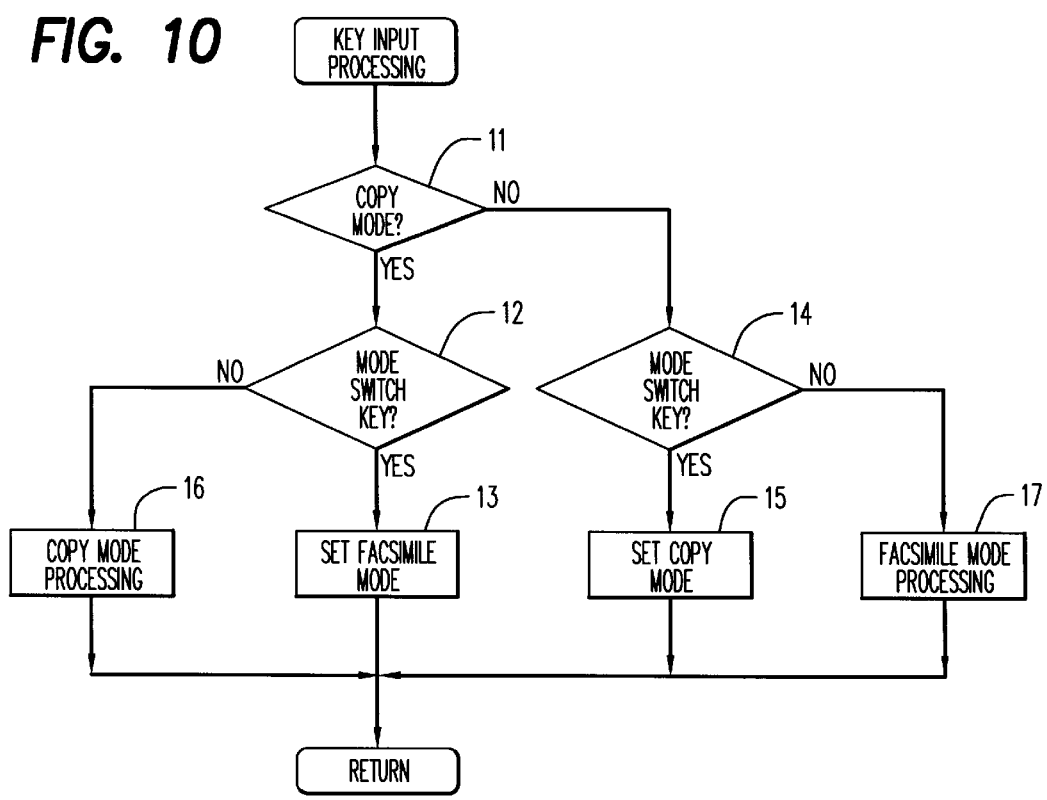
FIG. 10 is a flow chart showing the keyed input processing subroutine pertaining to #7 shown in FIG. 9.

FIG. 10 is a subroutine flow chart for keyed input processing pertaining to FIG. 9 #7, described previously.

In FIG. 10, a determination is first made as to whether or not the current mode is the copy mode. If the current mode is the copy mode (YES at #11), and, the keyed input detected by processing in the foregoing FIG. 9 #3 is that of mode switch key 98 (YES at #12), then the facsimile mode is set, the basic facsimile screen read from NVRAM 127 is displayed on liquid crystal touch panel 91, and indicator 98a is actuated (#13). Likewise, a determination is made as to whether or not the current mode is the copy mode, and if the current mode is not the copy mode and is thus the facsimile mode (NO at #11), and, the keyed input detected by processing in the foregoing FIG. 9 #3 is that of mode switch key 98 (YES at #14), then the copy mode is set, a copy operating screen read from NVRAM 127 is displayed on liquid crystal touch panel 91, and indicator 98b is actuated (#15).

If the keyed input detected by processing in the foregoing FIG. 9 #3 is not that of mode switch key 98 but input from another key (NO at #12 or #14), then copy mode processing in #16 or facsimile mode processing in #17 is respectively executed, according to the current mode.

Figure 11:
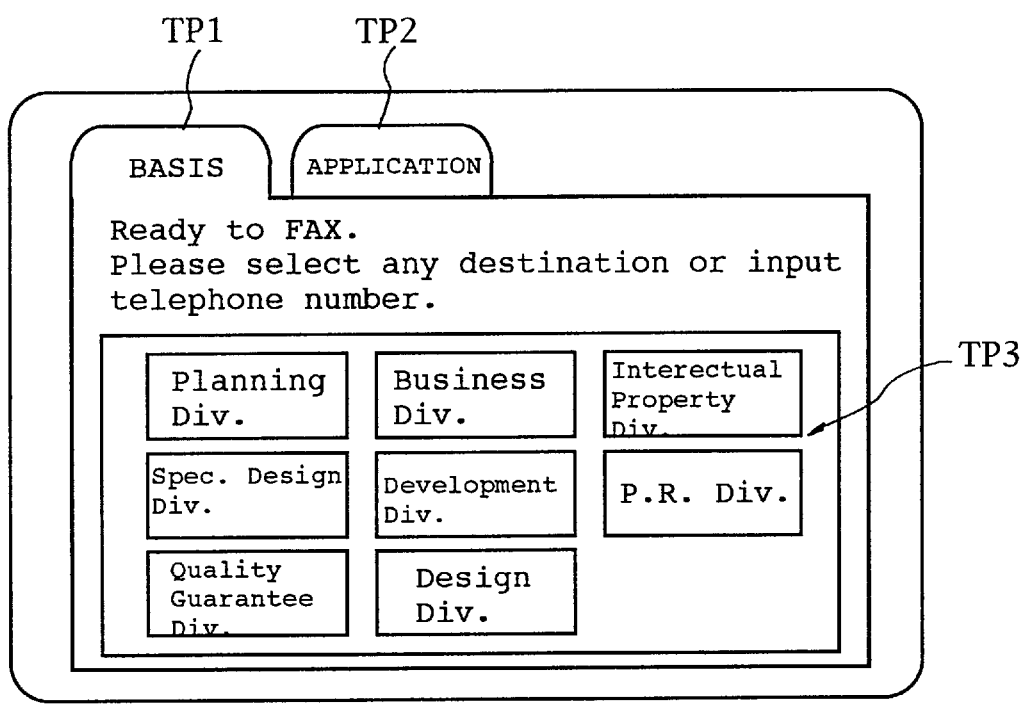
FIG. 11 shows the basic facsimile screen displayed on a liquid crystal touch panel.

Facsimile display screens will now be described. A basic screen, an application screen, and other screen are provided as facsimile display screen. FIG. 11 shows the basic facsimile screen displayed on the liquid crystal touch panel 91. Multiple destination selection keys TP3 displaying multiple previously registered facsimile destinations are displayed at the center portion of the basic facsimile screen. Pressing any destination selection key TP3 inputs the telephone number of the destination. When facsimile transmission is made to a non-registered destination, the telephone number of the destination can also be input directly by means of ten-key pad 92. Basic key TP1 and application key TP2 are displayed at the upper portion of the screen. When application key TP2 is pressed in the basic screen, an application screen is displayed in place of the basic screen, and when basic key TP1 is pressed in the application screen, the basic screen is displayed in place of the application screen.

Figure 12:
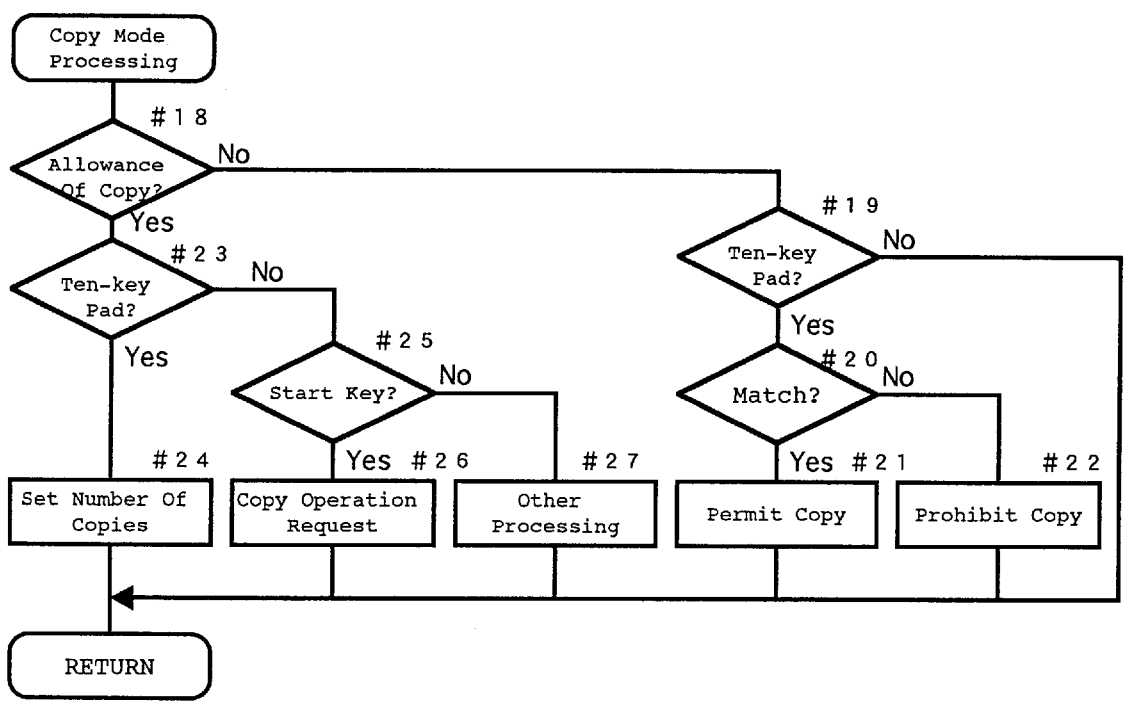
FIG. 12 is a flow chart showing the copy mode processing subroutine pertaining to #16 shown in FIG. 10.

Subroutines of the copy mode processing indicated by FIG. 10 #16 will now be described. FIG. 12 is a flow chart showing the copy mode processing subroutines.

First, in #18, a determination is made as to whether or not the current status allows copying. In the present embodiment, an operator must always input an ID number using ten-key pad 92 when the copy mode is established, and if the input ID number matches a previously registered ID number, an initial copy operation is permitted. The number of copies corresponding to each ID number is managed by a memory within the copy machine. If a copy operation is determined to be prohibited at #18 (NO at #18), a determination is made as to whether or not keyed input detected by the previous FIG. 9 #3 processing is that of ten-key pad 92 (#19), and if so (YES at #19), this input from ten-key pad 92 is assumed to be input of an ID number and is compared to previously registered numbers (#20). If the ID number input by means of ten-key pad 92 matches a previously registered number (YES at #20), copying is permitted at #21, and if the input does not match (NO at #20), further copying is prohibited at #22.

At #18, when ID number input is complete and copying has been found to be permitted (YES at #18), a determination is next made as to whether or not keyed input detected by the previous FIG. 9 #3 processing is that of ten-key pad 92 (#23), and if so (YES at #23), this input from ten-key pad 92 is assumed to be entry of a number of copies, and the value entered by means of ten-key pad 92 is set as the number of copies (#24). If the keyed input detected by the previous FIG. 9 #3 processing is not that of ten-key pad 92 (NO at #23), at #25, a determination is made as to whether or not this input is that of start key 96, and if so, at #26, a copy operation request is output to CPU 104 so that CPU 104 will start a copy operation. If the keyed input detected by the previous FIG. 9 #3 processing is not that of start key 96 (NO at #25), processing corresponding to the keyed input is performed (#27).

Figure 13A:
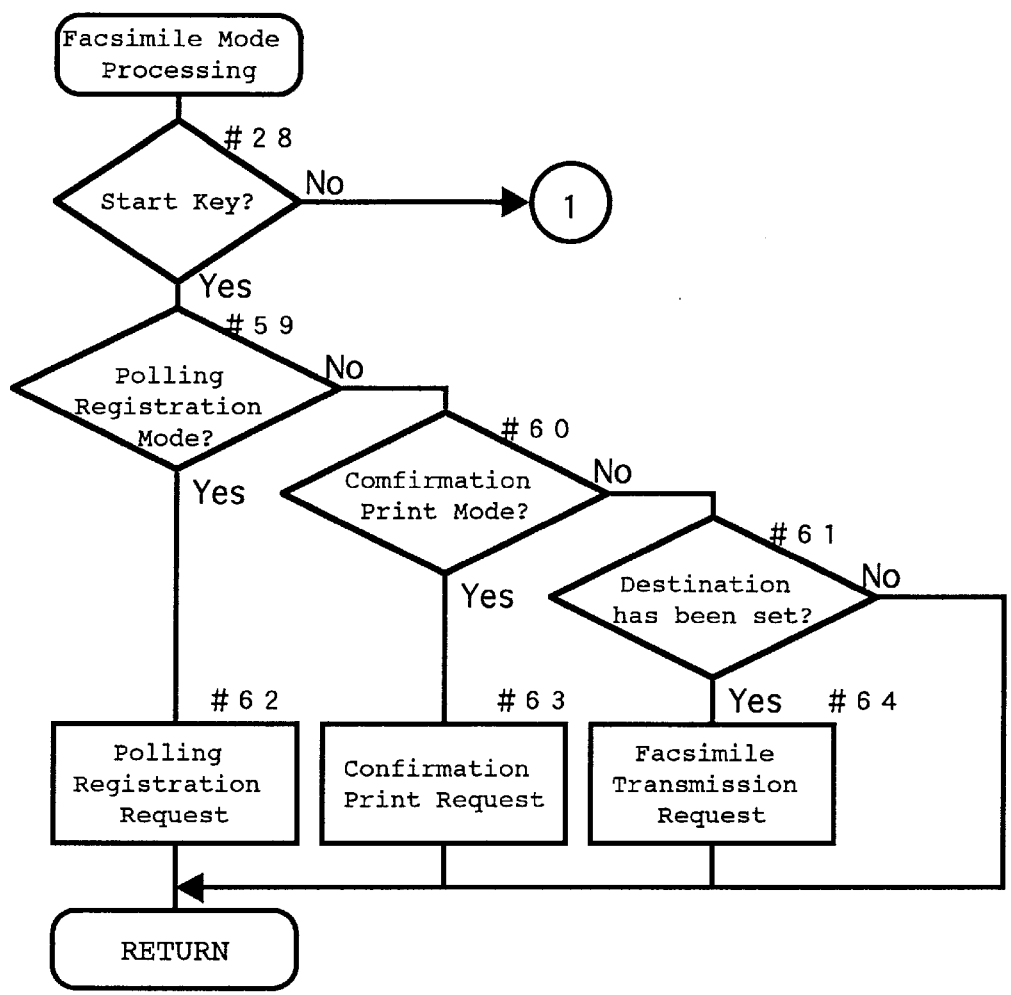
FIGS. 13a–13c are a flow chart showing the facsimile mode processing subroutine pertaining to #17 shown in FIG. 10.
Figure 13B:
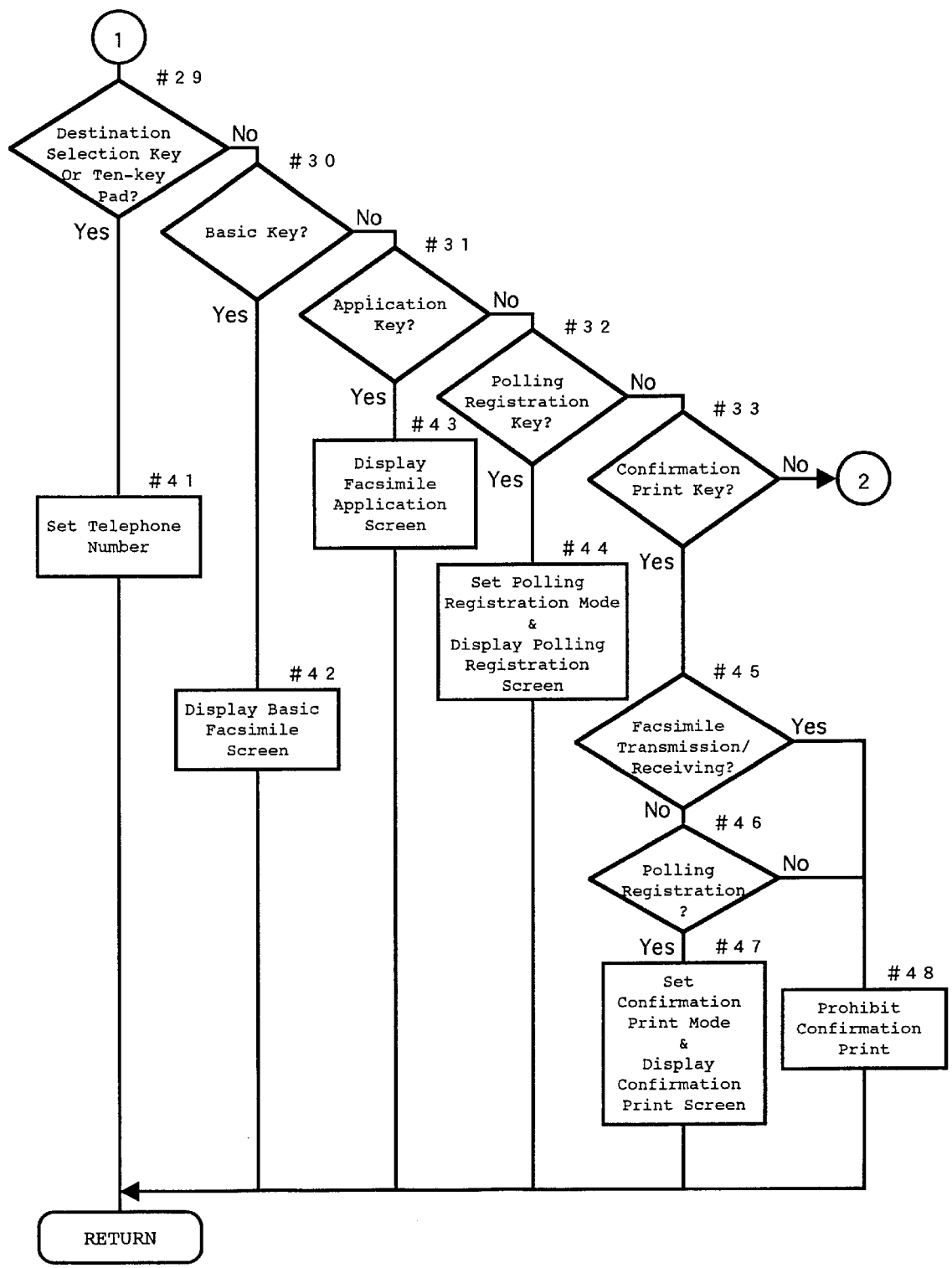

Subroutines of facsimile mode processing indicated by FIG. 10 #17 will now be described. FIGS. 13a, b, and c are flow charts showing the facsimile mode processing subroutines.

First, in #28 through #40, a determination is made as to whether or not keyed input detected by the previous FIG. 9 #3 processing is from any key. If the input is that of destination selection key TP3 or ten-key pad 92 (YES at #29), an input telephone number is set as the telephone number of a facsimile transmission destination.

If the keyed input detected by the previous FIG. 9 #3 processing is that of basic key TP1 (YES at #30), the basic facsimile screen is read from NVRAM 127 and displayed on liquid crystal touch panel 91 in place of the currently displayed screen (#42).

If the keyed input detected by the previous FIG. 9 #3 processing is that of application key TP2 (YES at #31), a facsimile application screen is read from NVRAM 127 and displayed on liquid crystal touch panel 91 in place of the currently displayed screen (#43).

Figure 14:
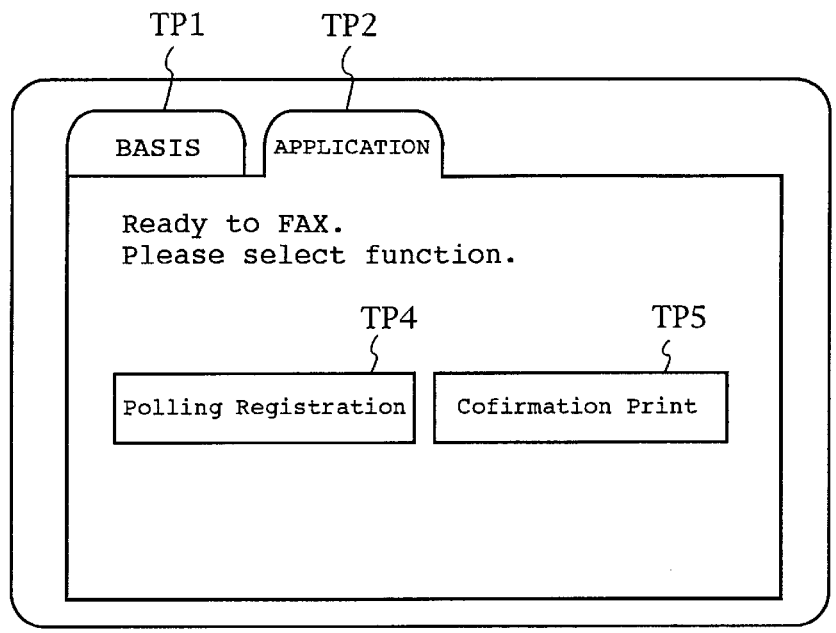
FIG. 14 shows the facsimile application screen displayed on a liquid crystal touch panel.

The application screen is as shown in FIG. 14. Polling registration key TP4 used to designate polling registration mode and confirmation print key TP5 used to designate confirmation print mode are displayed at the central portion of the screen, and basic key TP1 and application key TP2 are displayed at the top portion of the screen as in the previously described basic screen. When basic key TP1 is pressed in the application screen, the basic screen is displayed in place of the application screen.

If the keyed input detected by the previous FIG. 9 #3 processing is that of polling registration key TP4 on the application screen (YES at #32), the polling registration mode is set, and the polling registration screen is read from NVRAM 127 and displayed on liquid crystal touch panel 91 in place of the application screen (#44).

Figure 15:
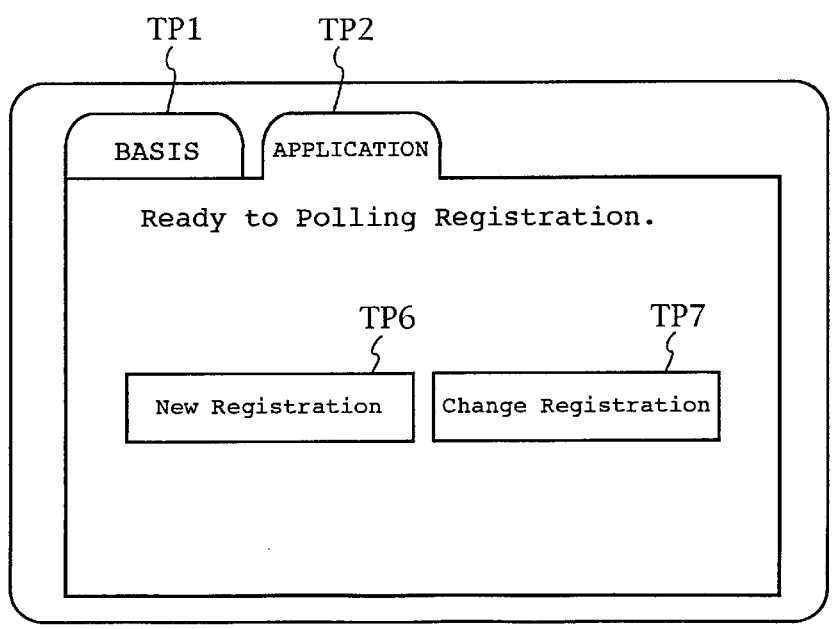
FIG. 15 shows the polling registration screen displayed a on liquid crystal touch panel.

The polling registration screen is as shown in FIG. 15. New registration key TP6 used to designate a new registration mode, for new polling registration, and change registration key TP7 used to designate a change registration mode, for changing previously completed polling registration, are displayed at the center portion of the screen. Basic key TP1 and application key TP2 are displayed at the top portion of the screen as in the previously described basic screen. When basic key TP1 is pressed in the polling registration screen, the basic screen is displayed in place of the polling registration screen, and when application key TP2 is pressed, the application screen is displayed in place of the polling registration screen.

If the keyed input detected by the previous FIG. 9 #3 processing is that of confirmation print key TP5 on the application screen (YES at #33), provided that facsimile transmission/reception is not in progress and polling registration has been carried out (NO at #45, YES at #46), the confirmation print mode is set, and the confirmation print screen is read from NVRAM 127 and displayed on liquid crystal touch panel 91 in place of the application screen (#47). If facsimile transmission/reception is in progress (YES at #45) or polling registration has not been carried out (NO at #46), confirmation printing is prohibited and is not executed.

Figure 16:
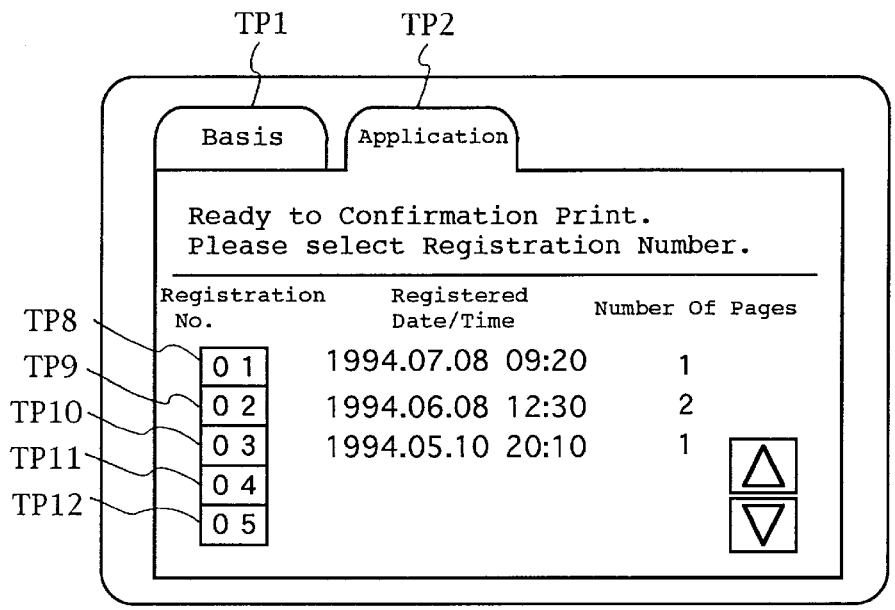
FIG. 16 shows the confirmation printing screen displayed on a liquid crystal touch panel.

The confirmation printing screen is as shown in FIG. 16. A list showing polling registration status is displayed at the center portion of the screen. In the present embodiment, multiple polling registration is possible at the same time. Thus, registration number keys TP8 through TP12 displaying registration numbers are shown, and a registered date and time and number of pages is shown beside registration numbers where registration has been performed. A scroll key used for scrolling the screen is displayed at the lower right corner of the display screen, and registration numbers can be displayed via scrolling by operation of this key. Basic key TP1 and application key TP2 are displayed at the top portion of the screen as in the previously described basic screen. When basic key TP1 is pressed in the confirmation printing screen, the basic screen is displayed in place of the confirmation printing screen, and when application key TP2 is pressed, the application screen is displayed in place of the confirmation printing screen.

Figure 17:
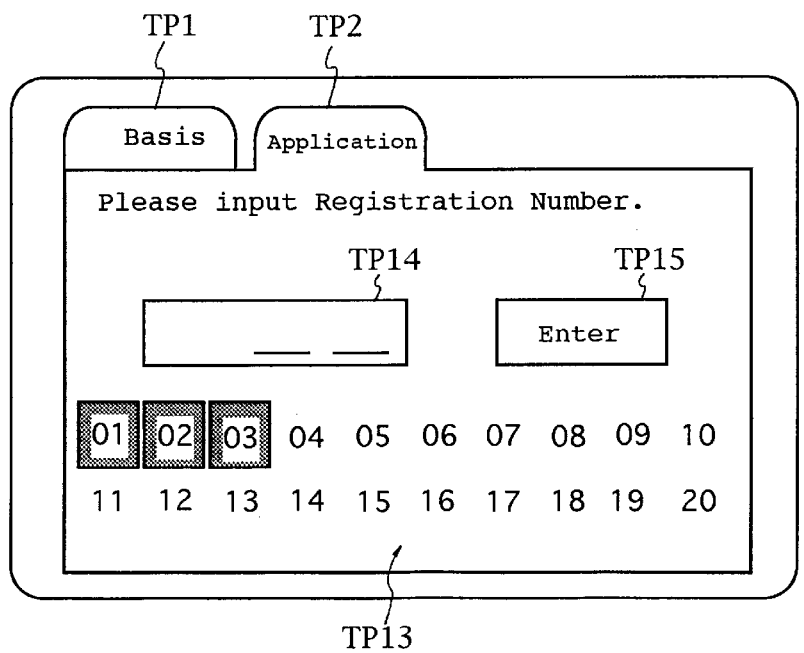
FIG. 17 shows the registration number designation screen displayed on a liquid crystal touch panel.

If the keyed input detected by the previous FIG. 9 #3 processing is that of new registration key TP6 on the polling registration screen (YES at #34), the new registration mode is set (#49), and a registration number designation screen is read from NVRAM 127 and displayed on liquid crystal touch panel 91 in place of the polling registration screen (#50). The registration number designation screen is as shown in FIG. 17. Registration number designation keys TP13 showing 20 registration numbers 01 through 20 available for polling registration are displayed at the center portion of the screen, and registration numbers previously used in registration are displayed in an inverse state. Above these keys appears indicator TP14 which displays registration numbers designated by registration number designation keys TP13. Through the display on display TP14, an operator checks for any errors in registration numbers designated by registration number designation keys TP13, and the operator confirms entries by pressing enter key TP15 displayed beside display TP14. Basic key TP1 and application key TP2 are displayed at the top portion of the screen as in the previously described basic screen. When basic key TP1 is pressed in the reservation number designation screen, the basic screen is displayed in place of the reservation number designation screen, and when application key TP2 is pressed, the application screen is displayed in place of the reservation number designation screen.

Figure 18:
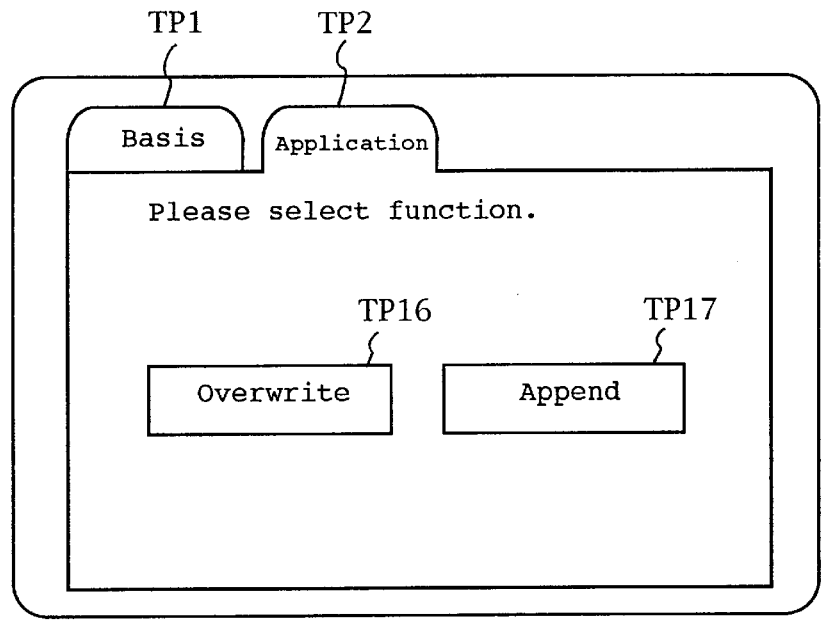
FIG. 18 shows the change registration screen displayed on a liquid crystal touch panel.

If the keyed input detected by the previous FIG. 9 #3 processing is that of change registration key TP7 on the polling registration screen (YES at #35), the change registration screen is read from NVRAM 127 and displayed on liquid crystal touch panel 91 in place of the polling registration screen (#51). The change registration screen is as shown in FIG. 18. Overwrite key TP16 which designates an overwrite mode, for overwriting image data registered for polling transmission, and append key TP17 which designates an append mode, for appending new image data to image data previously registered for polling transmission, are displayed at the center portion of the screen. Basic key TP1 and application key TP2 are displayed at the top portion of the screen as in the previously described basic screen. When basic key TP1 is pressed in the change registration screen, the basic screen is displayed in place of the change registration screen, and when application key TP2 is pressed, the application screen is displayed in place of the change registration screen.

If the keyed input detected by the previous FIG. 9 #3 processing is that of overwrite key TP16 on the change registration screen (YES at #36), the overwrite mode is set (#52), and the registration number designation screen is read from NVRAM 127 and displayed on liquid crystal touch panel 91 in place of the change registration screen (#53).

If the keyed input detected by the previous FIG. 9 #3 processing is that of append key TP17 on the change registration screen (YES at #37), the append mode is set (#54), and the registration number designation screen is read from NVRAM 127 and displayed on liquid crystal touch panel 91 in place of the change registration screen (#53).

If the keyed input detected by the previous FIG. 9 #3 processing is that of registration number designation keys TP13 on the registration number designation screen (YES at #38), the number designated by registration number designation keys TP13 is displayed on display TP14 (#55).

If the keyed input detected by the previous FIG. 9 #3 processing is that of enter key TP15 on the registration number designation screen (YES at #39), a registration number previously designated by registration number designation keys TP13 and displayed on display TP14 is set (#56), and a message screen is read from NVRAM 127 and displayed on liquid crystal touch panel 91 in place of the registration number designation screen (#57).

Figure 19:
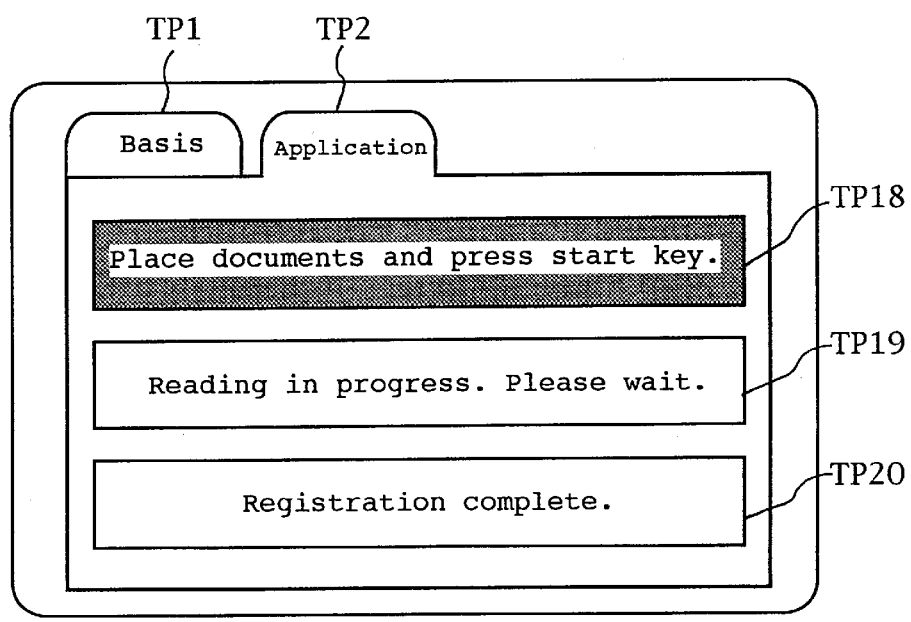
FIG. 19 shows the message screen displayed on a liquid crystal touch panel.

The message screen is as shown in FIG. 19. Three display areas TP18 through TP20 are provided at the center portion of the screen and display, respectively, "Place documents and press start key.", "Reading in progress. Please wait.", and "Registration complete." Because the registration number is now confirmed, display area TP18 is shown in reverse display to prompt the operator to place a document on document platen 19 and press start key 96 for the next operation.

If the keyed input detected by the previous FIG. 9 #3 processing is that of any of registration number keys TP8 through TP12 on the confirmation printing screen (YES at #40), the registration number designated by registration number keys TP8 through TP12 is set (#58).

If the keyed input detected by the previous FIG. 9 #3 processing is that of start key 96 (YES at #28), a determination is made as to whether or not the current mode is the polling registration mode (#59), and if so (YES at #59), CPU 101 outputs a polling registration request to CPU 104 (#62). If the current mode is not the polling registration mode (NO at #59), a determination is made as to whether or not the current mode is the confirmation print mode (#60), and if so (YES at #60), CPU 101 outputs a confirmation print request to CPU 104 (#63). If the current mode is not the confirmation print mode, (NO at #60), a current mode of regular facsimile transmission is assumed, and a determination is made as to whether or not a destination has been set by the #41 processing previously described (#61). If so (YES at #61), a facsimile transmission request is output to CPU 104 (#64).

If the keyed input detected by the previous FIG. 9 #3 processing is not that of any of the previously described keys (NO at #40), the processing for other key input at 65 is executed.

(4-2) CPU 104 Control Procedures

Figure 20:
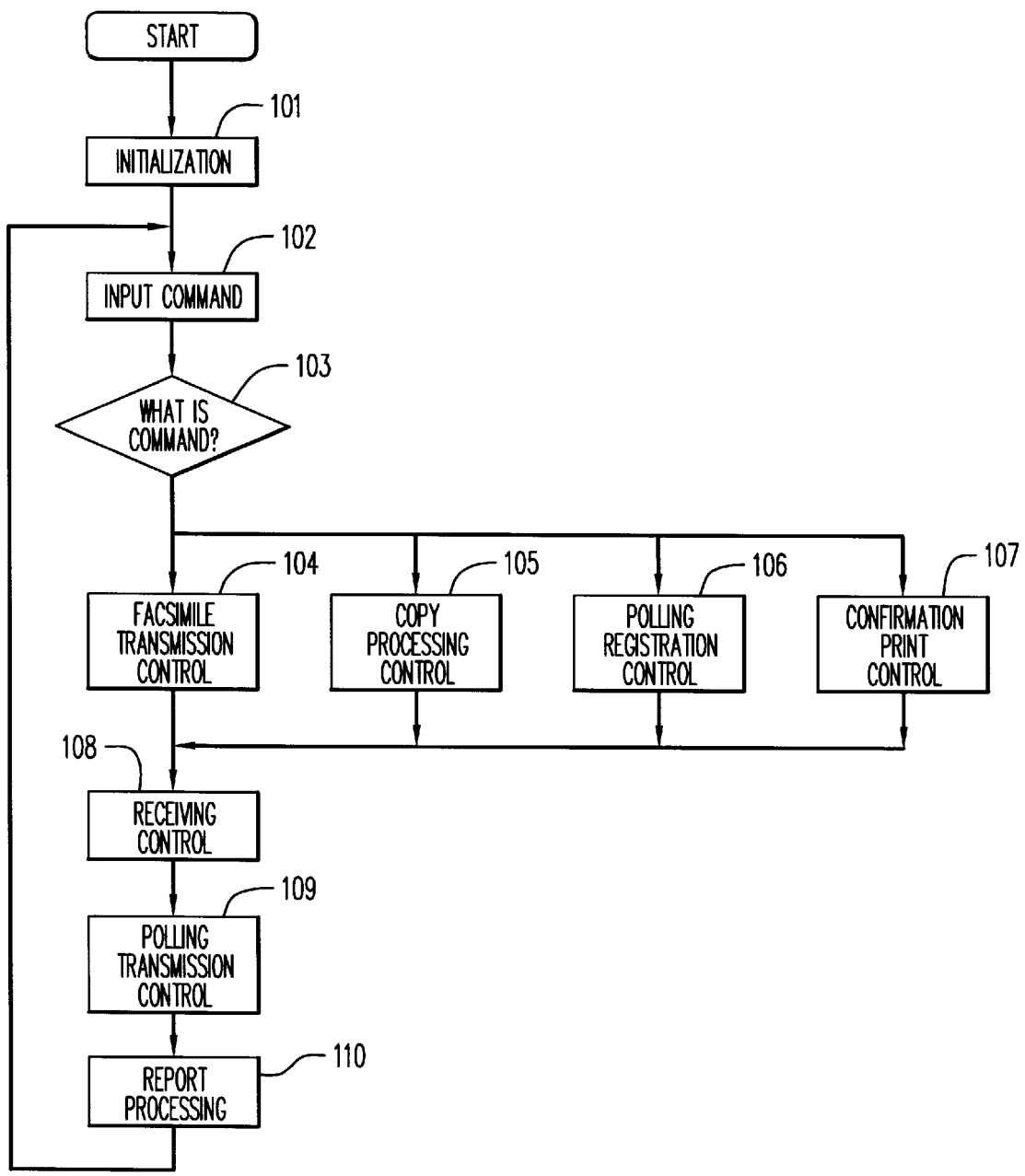
FIG. 20 is a main flow chart showing control procedures executed by the CPU 104.

FIG. 20 is a main flow chart showing the control procedures executed by CPU 104. Referring to FIG. 20, once the digital copying apparatus is powered on, initialization is carried out based on initial setting conditions recorded in RAM 114 (#101). Then, commands from CPU 101 which control operating panel OP are awaited. When a command is input from CPU 101 (#102), the command content is detected and corresponding processing is executed (#103 through #107). If a facsimile transmission request command is input, a facsimile transmission control subroutine is executed (#104). Specific processing in the facsimile transmission control subroutine is as noted in the foregoing Section (3-1); a scan request is output to CPU 102, image data read pursuant to the scan request is received, the image data is compressed, a destination set in the foregoing #41 is called, and facsimile transmission is carried out. If a copy request command is input, a copy processing control subroutine is executed (#105). In the copy processing control subroutine, as described in the foregoing Section (3-4), a scan request is output to CPU 102, image data read pursuant to the scan request is received and output to printer device PR, and the image data is printed. In addition, in the copy processing control subroutine, a mode change timer is reset to [0] before a copy operation begins, and after the copy operation ends, the mode change timer is started and begins timing a given interval. If a polling registration request command is input, a polling registration control subroutine is executed (#106). Such processing is subsequently described in detail with respect to FIG. 21 but is, in general, as per registration of polling transmissions described in the foregoing Section (3-3). If a confirmation print request command is input, a confirmation printing control subroutine is executed (#107). Such processing is subsequently described in detail with respect to FIGS. 27 and 29 but is, in general, as described in the foregoing Section (3-5).

Next, a receiving control subroutine is executed for print processing of received facsimile image data, or for processing the facsimile mode setting based on timeout of the mode change timer (#108). Such processing is subsequently described in detail with respect to FIG. 30.

If G3 unit 42 receives a polling designation number via a telephone line (PSTN), a polling transmission control subroutine (#109) is executed. Such processing is as described in the foregoing Section (3-3). Essentially, when an incoming call request from a calling receiving party is made to CPU 104, CPU 104 completes a line connection. CPU 104 then receives a polling designation number transmitted by the calling receiving party, searches the management table in RAM 124 for the received polling designation number, and reads the designated image data from code memory 126 on this basis. CPU 104 then provides the image data read from the memory to facsimile converter 41 where it undergoes image data conversion. The data is then modulated by a modem in G3 unit 42 and transmitted to the calling receiving party via a telephone line (PSTN).

In addition, report processing (#110) is carried out when a given number of facsimile transmissions have taken place, when a given number of facsimile receipts have taken place, or when an error occurs in facsimile transmission/reception. Such processing is subsequently described in detail with reference to FIG. 31.

Figure 21:
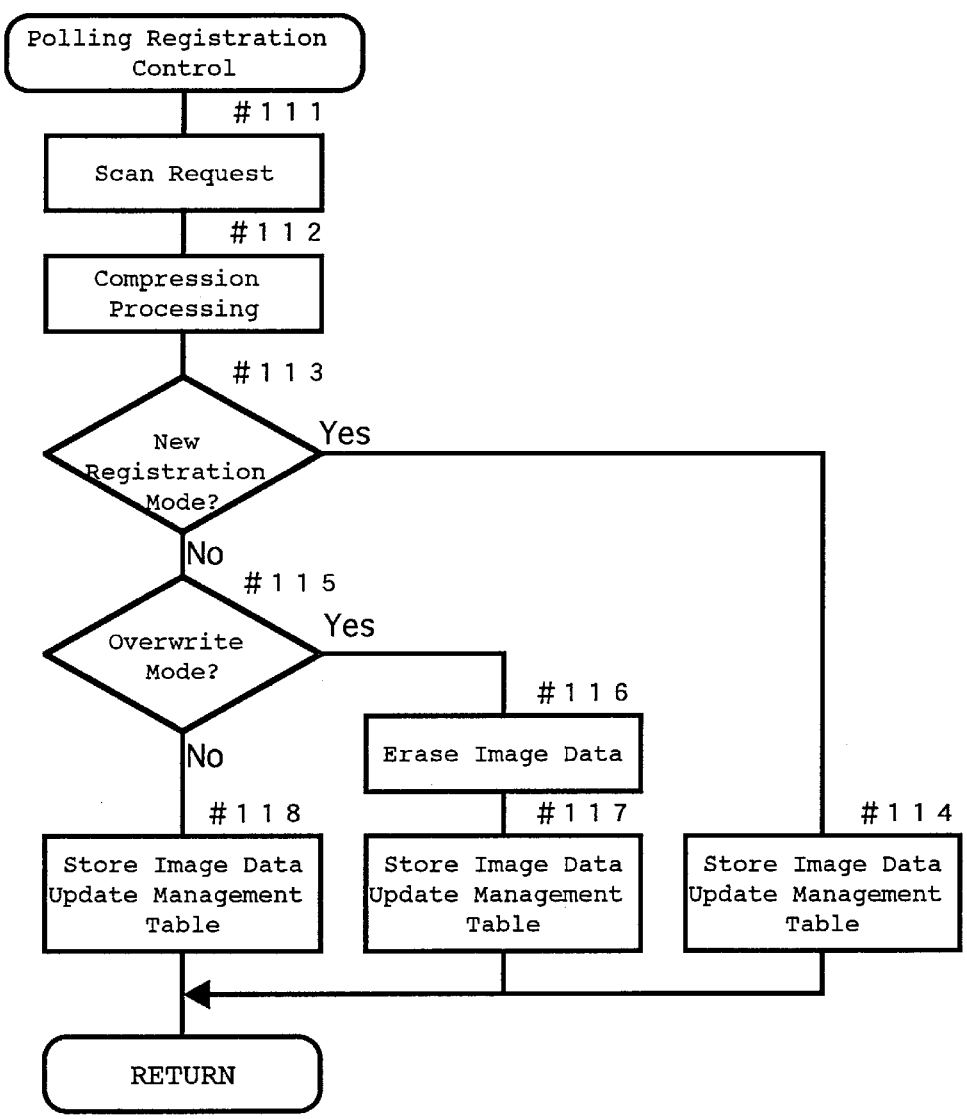
FIG. 21 is a flow chart showing the polling registration control subroutine pertaining to #106 shown in FIG. 20.

FIG. 21 is a flow chart of the polling registration control subroutine indicated by #106 in FIG. 20. First, in #111, a scan request is output to CPU 102. Accordingly, a document scan is executed, and image data from the scanned document is stored in image memory 125. Next, in #112, the image data stored in image memory 125 is read and undergoes compression processing. The compressed image data is processed in #113 through #118 discussed below and written into code memory 126. As previously described, multiple polling transmissions can be registered in code memory 126, and image data in code memory 126 is managed by a management table in RAM 124.

FIG. 22 is a figure showing an outline of the management table in pattern form, and FIG. 23 is a figure showing an outline of image data recorded in code memory 126. As shown in FIG. 23, code memory 126 is partitioned into 32 Kb-unit memory areas, and each partitioned area is assigned an area number in a sequence of 01, 02, 03 . . . and managed by the management table as an area unit. When a polling transmission is registered, image data of a document is stored in each area in compressed form. The management table provides information showing what type of image data is stored in each area of code memory 126. Page information, pre-link information, post-link information, registration number information, and additional information are stored in each area. Page information indicates the pages of a document for which image data is stored. Pre-link information and post-link information is information indicating the link status of each area when image data registered with a given registration number is stored across multiple areas. Storage of [00] as pre-link information indicates that the image data is the first of the registered image data, and storage of other than [00] indicates that the area stores image data that continues from image data stored in the area that the stored pre-link information indicates. Storage of [FF] as post-link information indicates storage of the final portion of the registered image data, and storage of other than [FF] indicates that continuing image data is stored in the area indicated by the stored postlink information. Polling number information indicates the registration number previously described. In areas storing image data that is not associated with a registration number, [00] is applied.

In a specific description concerning the circumstances shown in FIG. 22, a total of one page of document image data is stored in areas 01 and 02 under registration number 01; the first half of the image data of the single page is stored in area 01, and the second half is stored in area 02. A total of two pages of document image data is stored under registration number 02; the image data of the first page is stored in areas 03 and 04, and the image data of the second page is stored in areas 05 and 06. Area 03 is the first of areas 03, 04, 05, and 06; continuing image data is sequentially stored in areas 04, 05, and 06; and area 06 is the final portion of image data registered as registration number 02.

Thus, when a polling designation number is received from a calling receiving party, during polling transmission control #109, the management table is searched for the registration number. Image data stored in areas assigned to a registration number that matches the received polling designation number are read in a sequence consistent with pre-link information and post-link information, and facsimile transmission is carried out. For example, if the received polling designation number is [02], image data is read, in a sequence consistent with pre-link information and post-link information, from areas 03, 04, 05, and 06 assigned to the value [02] under registration number information in the management table, and facsimile transmission is carried out.

Referring again to FIG. 21, when a determination is made in #113 that the new registration mode has been established by processing pertaining to #49 (YES at #113), image data compressed in #112 is written into a free area in code memory 126 (#114). In addition, the management table is updated by assigning a registration number set by processing (#56) as the registration number for areas in the management table where image data is written, and by appropriately assigning pre-link information and post-link information. Document image data is thereby newly registered with a registration number designated on the registration number designation screen, and new registration of a polling transmission is complete.

When a determination is made in #115 that the overwrite mode has been established by processing pertaining to #52 (YES at #115), image data in code memory 126 previously registered with a registration number set in the foregoing #56 is erased (#116), image data compressed in #112 is written into the erased area, and the management table is updated (#117).

Processing pertaining to #116 and #117 will now be described in greater detail. The relationship between the amount of registered, existing image data erased in #116 and the amount of new image data newly written in #117 takes three forms.

The first is a case in which the amount of existing image data and new image data is equal, and in this case, image data designated by a registration number may be erased and the new image data written into the erased area.

The second is a case in which the amount of new image data is smaller than the amount of existing image data. In this case, the management table manages the area representing the difference between the existing image data and the new image data as if image data were not stored. For example, as shown in FIG. 22, two pages of image data is stored in areas 03 through 06 under registration number 02, and when a one page quantity of image data is newly registered in place of this image data, page information, pre-link information, and post-link information in management table areas 03 and 04 is overwritten as shown in FIG. 24 in order to register the new image data in areas 03 and 04. In addition, pre-link information and post-link information in areas 05 and 06 is set to [FF] and registration number information is set to [00] in order to manage these areas as if image data were not stored.

The third is a case in which the amount of new image data is greater than the amount of existing image data. In this case, new image data is written into the area where the existing image data is erased, and the excess new image data is written into another free area. For example, for the case shown in FIG. 22, when a two page quantity of new image data is registered in place of a one page quantity of image data stored in areas 01 and 02 under registration number 01, the first page of the new image data is written into areas 01 and 02, and the second page of the new image data is written into free areas 09 and 10. The management table in this case is as shown in FIG. 25; post-link information for area 02 is assigned [09], and area 09 shows that continued image data has been stored.

Referring again to FIG. 21, as described above, #115 through #117 constitute registration of polling transmissions in overwrite mode. Essentially, in registration of polling transmissions in overwrite mode, image data previously registered by a registration number designated on a registration number designation screen is exchanged for new image data.

Next, when the current mode is neither new registration mode (NO at #113) nor overwrite mode (NO at #115), i.e., when the append mode has been set in #54, image data compressed in #112 is written into a free area in code memory 126, and the management table is updated (#118) to link the written image data to image data registered with a registration number set by previous processing in #56.

Processing at #118 links new image data to previously registered image data. By way of example, as shown in FIG. 22, a case is described in which one page of image data is registered after being appended to a two page quantity of image data registered under registration number 02. In this case, as shown in FIG. 26, the appended one page quantity of image data is registered under registration number 02 in free areas 09 and 10, and post-link information for area 06, where the final image data of registration number 02 was stored, is changed to [09] and thus linked to the newly registered, appended one page quantity of image data. Thus, during polling transmission, when a receiving party designates [02] as a polling designation number, a total three page quantity of image data is sequentially read and supplied for facsimile transmission; the existing two page quantity of image data stored in areas 03 through 06, and the appended one page quantity of image data stored in areas 09 and 10.

Figure 27:
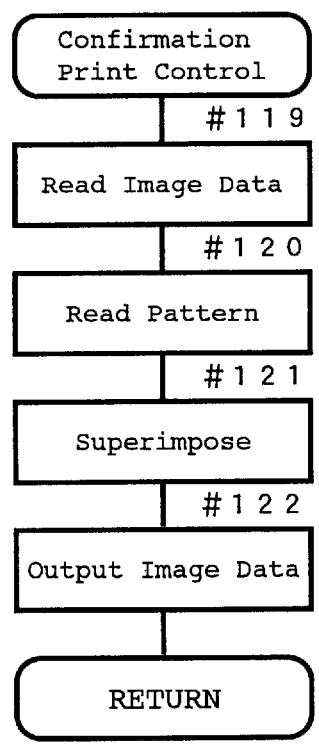
FIG. 27 is a flow chart showing the confirmation printing control subroutine pertaining to #107 displayed in FIG. 20.
Figure 28A:
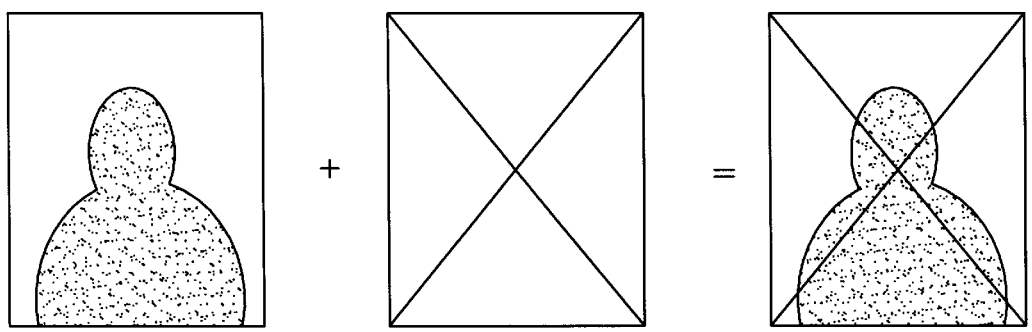
FIGS. 28a and 28b shows the output appearance in confirmation printing.

The confirmation printing control subroutine indicated by #107 in FIG. 20 will now be described. FIG. 27 is a flow chart showing the confirmation printing control subroutine. Upon receiving a confirmation print request from CPU 101, CPU 104 first refers to the management table and reads and decompresses (#119) image data in code memory 126 registered with a registration number set by prior processing at #58. Next, CPU 104 reads a predetermined pattern from ROM 114 (#120) and combines the pattern, in image memory 125, with an image read by processing at #119. FIG. 28a is a figure showing an outline of this process. Here, an "X" has been stored in ROM 114 as a predetermined pattern, and the predetermined pattern is superimposed on the registered image data. At #122, the combined image data is output to printer device PR and printed. Confirmation printing is a mode that is carried out to allow an operator to check image data registered for polling transmission, and the printing is combined with a predetermined pattern to permit discrimination from copy printing.

Figure 29:
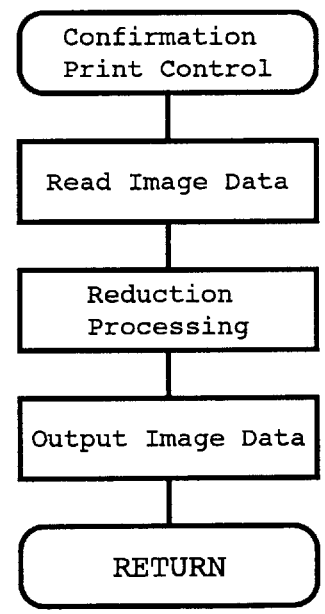
FIG. 29 is a flow chart showing the variation of confirmation printing control subroutine.
Figure 28B:
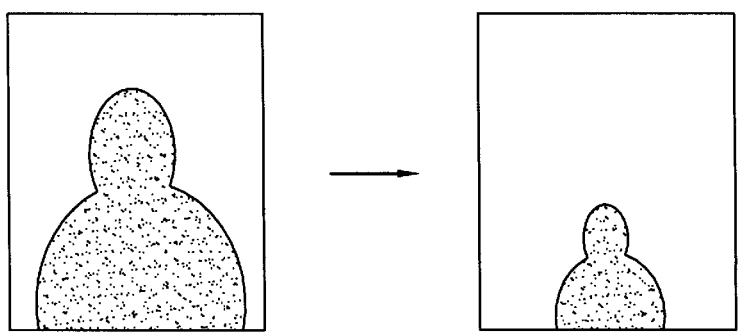

Confirmation printing control pertaining to FIG. 29 can be employed in place of that pertaining to FIG. 27. In confirmation printing control pertaining to FIG. 29, an image is not combined with a predetermined pattern, and reduced printing as shown in FIG. 28b permits discrimination from a copy.

In addition, there is no limitation to combination with a predetermined pattern or reduced printing, and other methods such as changing print color or printing as a negative image are acceptable.

Figure 30:
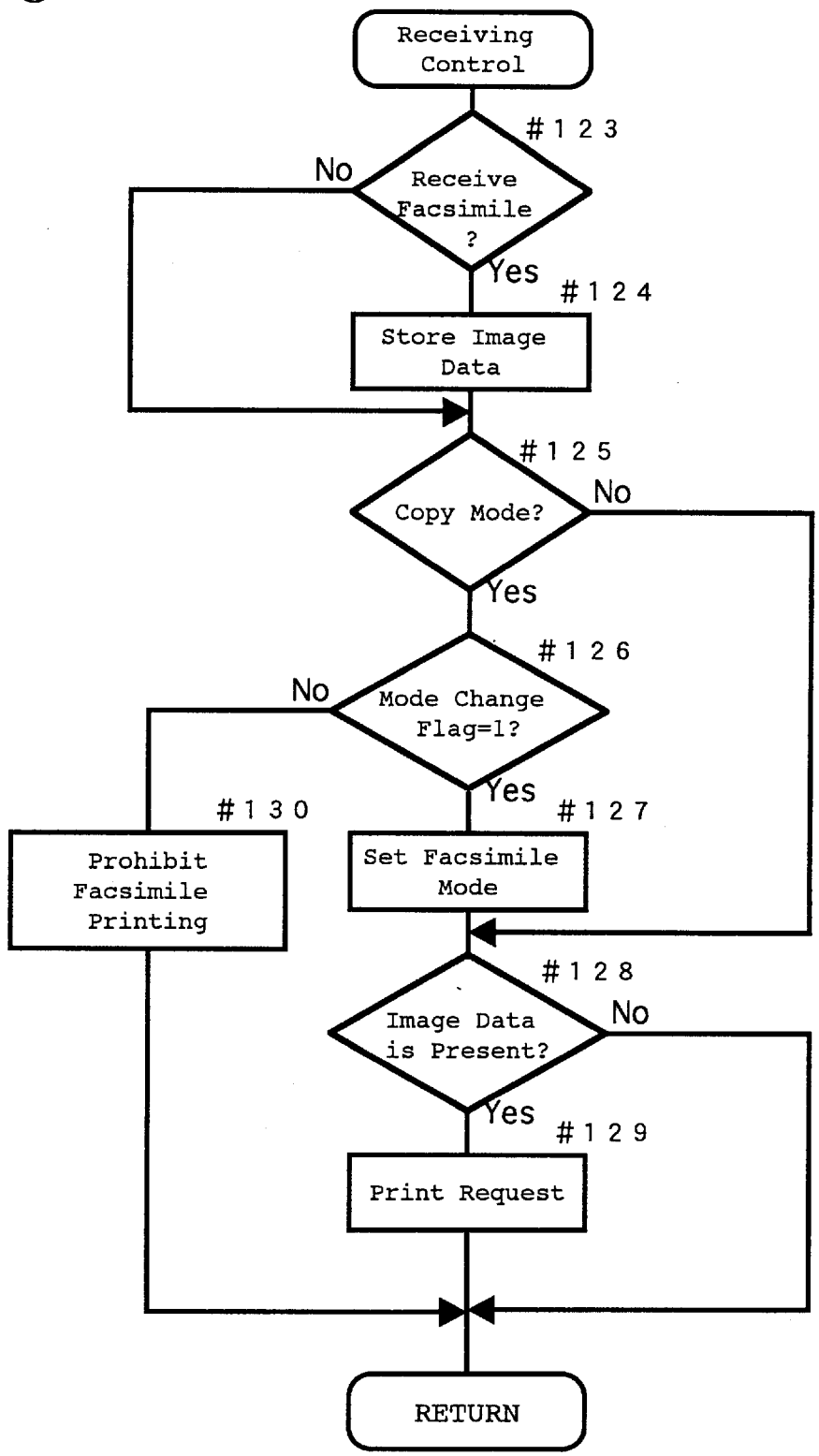
FIG. 30 is a flow chart showing the receiving control subroutine pertaining to #108 displayed in FIG. 20.

Reception control indicated by #108 in FIG. 20 will now be described. FIG. 30 is a flow chart showing the reception control subroutine. First, a determination is made at #123 as to whether or not a facsimile transmission has been received, and if so (YES at #123), the received image data is stored in code memory 126 (#124). Next, a determination is made as to whether or not the current mode is copy mode (#125), and if so (YES at #125), the mode change flag is checked. If it is set to [1] (YES at #126), switching from copy mode to facsimile mode takes place at #127. Essentially, as previously described, the mode change flag is a flag set to [1] after passage of a given interval from the last keyed input or after passage of a given interval from the end of a copy operation, and the facsimile mode is automatically established by processing at #127 after passage of a given interval from the end of a copy operation. In the facsimile mode (when the facsimile mode has been established at #127 or when NO is determined at #125), a determination is made as to whether image data received in code memory 126 by the foregoing processing at #124 has been stored (#128), and if image data is present (YES at #128), the image data is decompressed and output to printer device PR (#129). In addition, if it is determined at #126 that the mode change flag is not set to [1] (NO at #126), print processing of the data is canceled even if the image data is received as a facsimile (#130).

As heretofore described, in the reception control shown in FIG. 30, the facsimile mode is automatically established after passage of a given interval from the last keyed input or after passage of a given interval from the end of a copy operation, and if received image data is present in code memory 126 when the facsimile mode is established, automatic printing of the image data begins. In contrast, when the given interval has not passed, received image data is stored in code memory 126, but a print operation is not executed until the given interval has passed.

Figure 31:
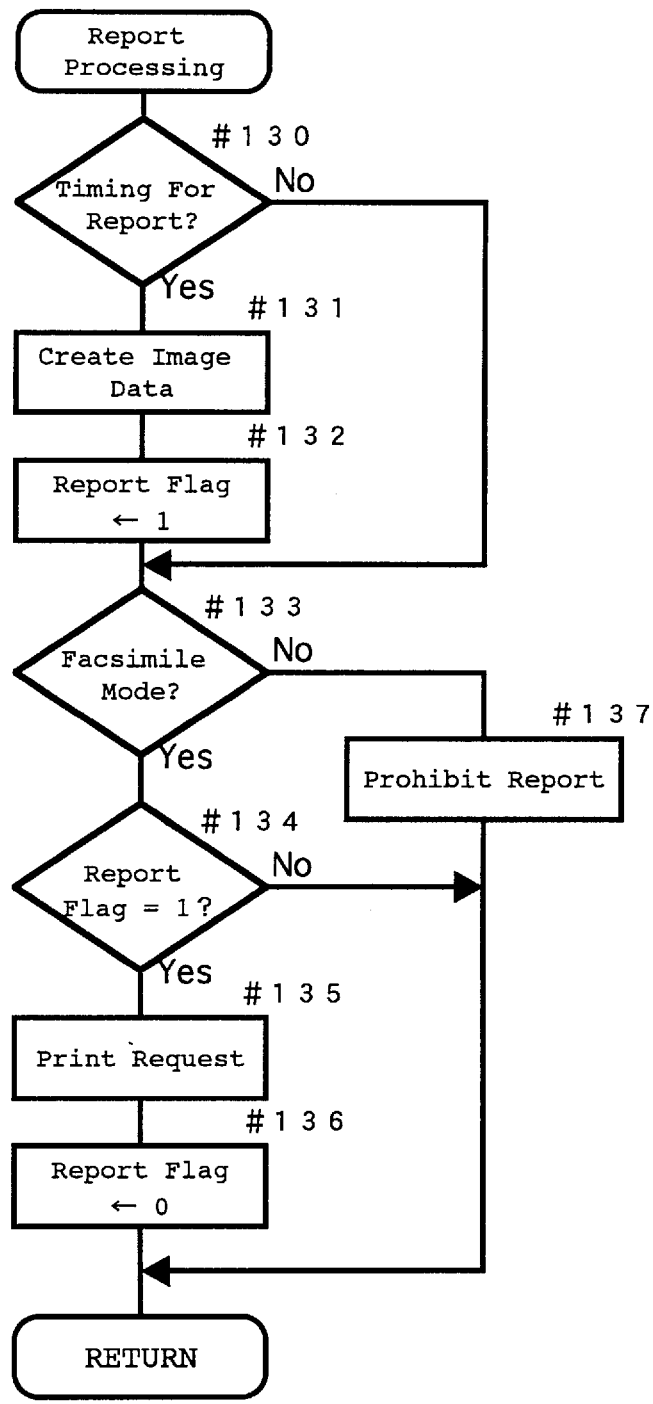
FIG. 31 is a flow chart showing the report processing subroutine pertaining to #110 displayed in FIG. 20.

Report processing indicated by #110 in FIG. 20 will now be described. FIG. 31 is a flow chart showing the report processing subroutine. First, at #130, a determination is made as to whether or not it is time to produce a report. "Report" as mentioned here indicates a previously described transmission report, transmission error report, receiving report, or receiving error report. A transmission report or receiving report is automatically printed after a given number of facsimile transmissions or receptions, or at a given interval (e.g., 12:00 daily). A transmission error report or receiving error report is automatically printed when a communication error or other abnormality occurs during facsimile transmission/reception. Thus, at #130, a determination is made as to whether a given number of facsimile transmissions/receptions have taken place, whether a given time (12:00) has arrived, whether a communication error or other abnormality has occurred during facsimile transmission/reception and whether it is time for production of a report (YES at #130). Image data for a report to be produced is then created in image memory 125 (#131), and a report flag is set to [1], showing that image data for a report to be printed is present in image memory 125. Next, a determination is made as to whether or not the current mode is the facsimile mode (#133), and if so (YES at #133), report flag status is assessed (#134). If it is determined that the report flag is set to [1] (YES at #134), i.e., if image data for a report to be output is present in image memory 125, a print request is output to CPU 103, image data for the report is printed by printer device PR (#135), and the report flag is reset to [0]. If the current mode is not the facsimile mode (NO at #133), i.e., when the current mode is the copy mode, report output is prohibited (#137).

As the foregoing description shows, in report processing, report image data is created at the time for report output, and if the current mode is the facsimile mode report printing is executed immediately. However, if report image data is created and the current mode is the copy mode, report printing is not carried out until the facsimile mode is established. Switching from copy mode to facsimile mode is performed automatically by processing pertaining to #125 through #127 in FIG. 30 after passage of a given interval from the last keyed input or after passage of a given interval from the end of a copy operation. Thus, report printing is carried out after awaiting such processing.

(4-3) CPU 102 Control Procedures

Figure 32:
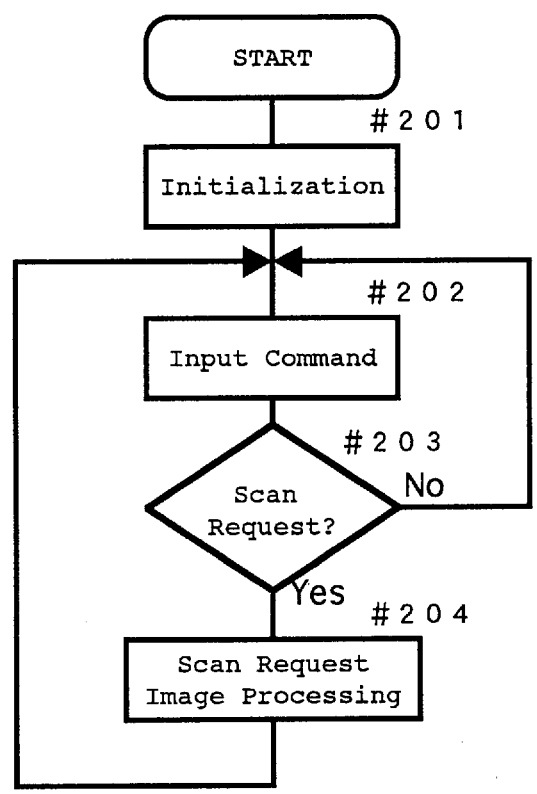
FIG. 32 is a main flow chart showing control procedures executed by the CPU 102.

FIG. 32 is a flow chart showing the control procedures executed by CPU 102. Referring to FIG. 32, once the digital copying apparatus is powered on, initialization is carried out based on initial setting conditions recorded in RAM 114 (#201). Then, a command from CPU 104 is input (#202), and when a scan request command is input (YES at #203), appropriate image processing is performed on image data obtained by this scan (#204), and the image data is then sent to CPU 104.

(4-4) CPU 103 Control Procedures

Figure 33:
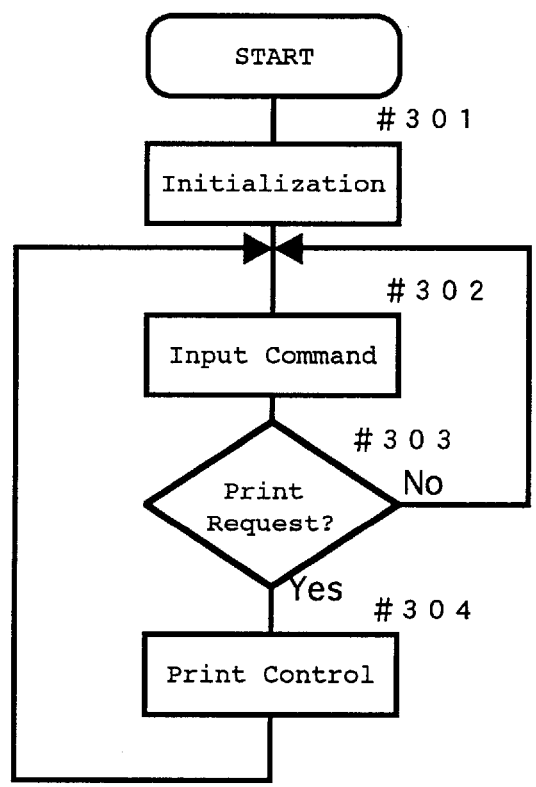
FIG. 33 is a main flow chart showing control procedures executed by the CPU 103.

FIG. 33 is a flowchart showing the control procedures executed by CPU 103. Referring to FIG. 33, once the digital copying apparatus is powered on, initialization is carried out based on initial setting conditions recorded in RAM 123 (#301). Then, a command from CPU 104 is input (#302), and when a scan request command is input (YES at #303), printing of image data transmitted from CPU 104 is executed by printer device PR (#304).

As described above, in accordance with the present invention, multiple sets of image data for polling transmission registered in code memory 126 are managed, in conjunction with a registration number, by a management table stored in RAM 124. Thus, through processing pertaining to #109 in FIG. 20, executed by CPU 104, image data corresponding to a registration number designated by a receiving party is read, and facsimile transmission is carried out.

Figure 13C:
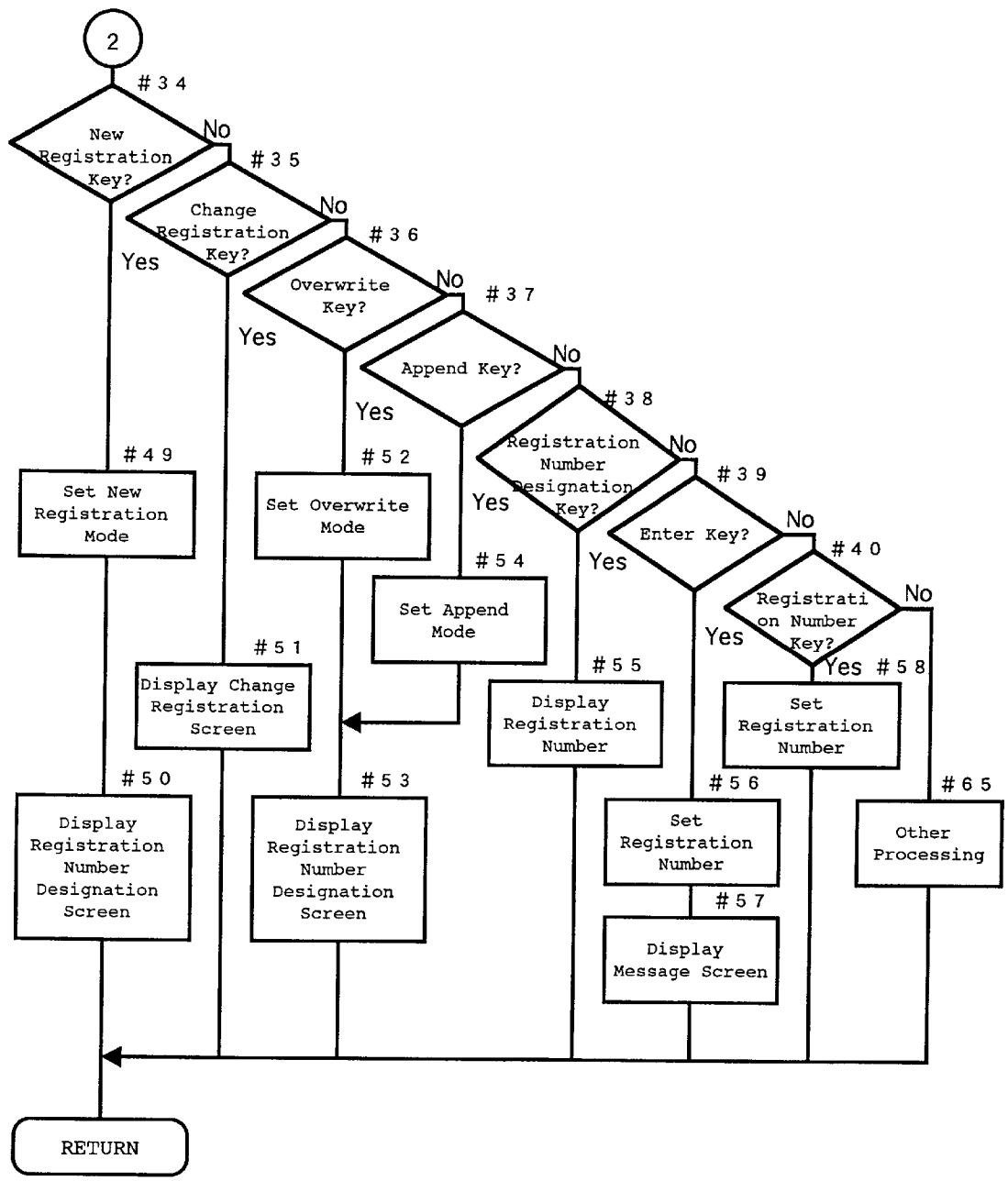

In addition, multiple sets of image data for polling transmission registered in code memory 126 can be easily changed by establishing an overwrite mode or an append mode through operation of keys displayed on liquid crystal touch panel 91 of operating panel OP. Essentially, when overwrite key TP16 on a change registration screen, shown in FIG. 18, is pressed, processing pertaining to #52 in FIG. 13c, executed by CPU 101, establishes an overwrite mode. Then, in the overwrite mode, a registration number is designated by registration number designation keys TP13 and enter key TP15 on a registration number designation screen, shown in FIG. 17. Through processing pertaining to #116 and #117 in FIG. 21, executed by CPU 104, newly read image data is stored in code memory 126 so as to correspond to the designated registration number, and this data replaces image data in code memory 126 stored in association with the designated registration number. In addition, when append key TP17 on the change registration screen, shown in FIG. 18, is pressed, processing pertaining to #54 in FIG. 13c, executed by CPU 101, establishes an append mode. In the append mode, a registration number is designated by registration number designation keys TP13 and enter key TP15 on a registration number designation screen, shown in FIG. 17. Through processing pertaining to #118 in FIG. 21, executed by CPU 104, newly read image data is stored in code memory 126 so as to correspond to the designated registration number, and this data is added to image data in code memory 126 stored in association with the designated registration number.

In addition, in accordance with the present invention, when keyed input is provided by processing pertaining to #3 through #5 in FIG. 9, a mode change timer times a given interval, and when the mode change timer times the given interval, the facsimile mode is established by processing pertaining to #126 and #127 in FIG. 30. When the facsimile mode is established, if image data received in the copy mode is present in code memory 126, this data is printed by printer device PR through processing pertaining to #128 and #129 in FIG. 30.

In addition, when the proper time for output of a report (facsimile transmission/reception communication report) arrives during the copy mode, after keyed input is provided and a given interval is timed, or after a copy operation ends and a given interval passes, processing pertaining to FIG. 31 establishes facsimile mode, and the report is immediately printed.

Furthermore, in accordance with the present invention, document image data registered for polling transmission is stored in code memory 126 by processing in FIG. 21, executed by CPU 104, and the data undergoes facsimile transmission through processing pertaining to #108 in FIG. 20. The image data stored in code memory 126 may be printed by means of confirmation printing control in FIG. 27, executed by CPU 104, and when printed, the image data is output as combined with a predetermined pattern. Thus, discrimination from a copy image is easily carried out, and copying via confirmation printing is prevented.

In accordance with the present invention, the printed output appearance from the copying apparatus is made to be different in a copy mode and in a confirmation printing mode, so that the execution of copying by way of confirmation printing is thereby inhibited.

What is claimed is:

1. A digital copying apparatus having facsimile functions, said digital copying apparatus comprising:
    a reading means which reads a document image and generates image data;
    a memory which stores document image data read by said reading means;
    a facsimile means which reads image data stored in said storage means and transmits the image data as a facsimile transmission;
    a registration means which registers at least some of the stored image data for facsimile transmission at a later time;
    a mode setting means which sets a copy mode or a confirmation printing mode; and
    a printing means which, when the copy mode is set by said mode setting means, executes copying of document image data read by said reading means, and which, when the confirmation printing mode is set by said mode setting means, reads registered image data from said memory and prints said registered image data, wherein said print means causes printed image data to have different appearances in the copy mode and in the confirmation printing mode.

2. A digital copying apparatus as claimed in claim 1, wherein said printing means prints a document in which the registered image data is combined with a predetermined pattern when the confirmation printing mode is set by said mode setting means.

3. A digital copying apparatus as claimed in claim 1, wherein said printing means prints a reduced image of the registered image data when the confirmation printing mode is set by said mode setting means.

4. A digital copying apparatus having facsimile functions, said digital copying apparatus comprising:
    a reading means which reads a document image and generates image data;
    a memory which stores multiple sets of image data read by said reading means, said multiple sets of image data respectively corresponding to different registration numbers;
    a facsimile means which reads image data stored in said storage means and transmits the image data to a receiving party;
    a designating means which designates a registration number;
    a mode setting means which sets a copy mode or a confirmation printing mode; and
    a printing means which, when the copy mode is set by said mode setting means, executes copying of document image data read by said reading means, and which, when the confirmation printing mode is set by said mode setting means, reads the image data corresponding to the registration number designated by said designating means from the said memory and prints said read image data, wherein said print means automatically modifies the printed image data so that the printed image has a different appearance from the original image in the confirmation printing mode.

5. A digital copying apparatus as claimed in claim 4, wherein said printing means prints a document in which the image data is combined with a predetermined pattern when the confirmation printing mode is set by said mode setting means.

6. A digital copying apparatus as claimed in claim 4, wherein said printing means prints a reduced image of the image data when the confirmation printing mode is set by said mode setting means.

7. A digital copying apparatus as claimed in claim 4, wherein said facsimile means reads the image data which corresponds to the registration number designated by the receiving party.

8. In a digital copying apparatus having facsimile functions, a method for controlling the printing of documents, comprising the steps of:
    scanning a document to generate image data and storing said image data in a memory;
    registering as least some of the stored image data for facsimile transmission at a later time;
    detecting whether the copying apparatus is in a copying mode of operation or a confirmation printing mode of operation;
    printing the image data stored in the memory to produce a copy of the document when the copying apparatus is in a copying mode of operation; and
    modifying registered image data and printing the modified image data to produce an altered copy of the document when the copying apparatus is in the confirmation printing mode.

9. The method of claim 8 wherein the step of modifying the image data comprises the step of combining the image data with additional image data that produces a predefined pattern in the printed copy.

10. The method of claim 8 wherein the step of modifying the image date comprises the step of reducing the size of the printed image.

11. A digital copying apparatus having facsimile functions, said digital copying apparatus comprising:
    a reading means which reads a document image and generates image data;
    a memory which stores document image data read by said reading means;
    a facsimile means which reads image data stored in said storage means and transmits the image data as a facsimile transmission;
    a mode setting means which sets a copy mode, in which printing of copies is prohibited until user access has been granted, or a confirmation printing mode, in which printing of copies is permitted without prior grant of user access; and
    a printing means which, when the copy mode is set by said mode setting means, executes copying of document image data read by said reading means after user access has been granted, and which, when the confirmation printing mode is set by said mode setting means, automatically modifies the image data from the said memory and prints said modified image data.

* * * * *